United States Patent
Jauh et al.

(10) Patent No.: US 12,075,468 B2
(45) Date of Patent: Aug. 27, 2024

(54) METHOD AND DEVICE FOR DATA TRANSMISSION, MULTI-LINK SYSTEM, AND STORAGE MEDIUM

(71) Applicant: SPREADTRUM COMMUNICATIONS (SHANGHAI) CO., LTD., Shanghai (CN)

(72) Inventors: Yuh-Ren Jauh, Shanghai (CN); Yanchao Xu, Shanghai (CN); Ching-Hwa Yu, Shanghai (CN); Long Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 23 days.

(21) Appl. No.: 17/427,891

(22) PCT Filed: Mar. 27, 2020

(86) PCT No.: PCT/CN2020/081780
§ 371 (c)(1),
(2) Date: Aug. 2, 2021

(87) PCT Pub. No.: WO2020/156592
PCT Pub. Date: Aug. 6, 2020

(65) Prior Publication Data
US 2022/0124798 A1    Apr. 21, 2022

(30) Foreign Application Priority Data
Jan. 31, 2019  (CN) .................. 201910098236.6

(51) Int. Cl.
*H04W 74/08*    (2024.01)
*H04L 45/24*    (2022.01)
*H04L 47/12*    (2022.01)

(52) U.S. Cl.
CPC ............ *H04W 74/08* (2013.01); *H04L 45/24* (2013.01); *H04L 47/12* (2013.01)

(58) Field of Classification Search
CPC .............................. H04W 74/08; H04L 47/12
See application file for complete search history.

(56) References Cited

U.S. PATENT DOCUMENTS 10,299,148 B2    5/2019  Chang et al.
2004/0264475 A1  12/2004  Kowalski
(Continued)

FOREIGN PATENT DOCUMENTS

CN    104023408 A    9/2014
CN    104270684 A    1/2015
(Continued)

OTHER PUBLICATIONS

Extended European Search Report for Application No. 20747698.7, dated Aug. 19, 2022, in 15 pages.
(Continued)

*Primary Examiner* — Benjamin Lamont
(74) *Attorney, Agent, or Firm* — Knobbe, Martens, Olson & Bear, LLP

(57) ABSTRACT

Provided are a method for data transmission, a device for data transmission, a multi-link system, and a storage medium. The method for data transmission is applied to a first device having a plurality of links to a second device. The method includes: determining an available link from the plurality of links for data to be transmitted to the second device; and transmitting the data based on a result of transmission right contention of the plurality of links.

19 Claims, 16 Drawing Sheets

(56) References Cited

U.S. PATENT DOCUMENTS

| | | | |
|---|---|---|---|
| 2007/0028144 A1* | 2/2007 | Graham | G06F 11/2038 714/34 |
| 2008/0144495 A1* | 6/2008 | Frank | H04L 47/30 370/230 |
| 2012/0158998 A1* | 6/2012 | O'Shea | H04L 69/40 709/245 |
| 2015/0103663 A1 | 4/2015 | Amini et al. | |
| 2015/0131446 A1 | 5/2015 | Kwan et al. | |
| 2016/0037557 A1 | 2/2016 | Gu et al. | |
| 2016/0150429 A1* | 5/2016 | Chang | H04W 48/20 370/338 |
| 2016/0285645 A1* | 9/2016 | Kim | H04L 12/40065 |
| 2018/0184453 A1* | 6/2018 | Viger | H04W 74/085 |
| 2018/0205502 A1 | 7/2018 | Merlin et al. | |
| 2018/0206143 A1 | 7/2018 | Patil et al. | |
| 2018/0206174 A1 | 7/2018 | Zhou et al. | |
| 2018/0206190 A1 | 7/2018 | Cherian et al. | |
| 2018/0206284 A1 | 7/2018 | Zhou et al. | |

FOREIGN PATENT DOCUMENTS

| | | |
|---|---|---|
| CN | 105636078 A | 6/2016 |
| CN | 105636108 A | 6/2016 |
| CN | 105891931 A | 8/2016 |
| CN | 109890053 A | 6/2019 |
| WO | WO 2018136521 A1 | 7/2018 |

OTHER PUBLICATIONS

First Office Action for CN 201910098236.6.
First Search Report for CN 201910098236.6.
International Search Report for PCT/CN2020/081780 dated May 27, 2020.

* cited by examiner

METHOD AND DEVICE FOR DATA TRANSMISSION, MULTI-LINK SYSTEM, AND STORAGE MEDIUM

CROSS-REFERENCE TO RELATED APPLICATIONS

This patent application is a US National Phase application of International Application No. PCT/CN2020/081780, filed on Mar. 27, 2020, which claims priority to Chinese Patent Application No. 201910098236.6 filed on Jan. 31, 2019, the disclosure of each of which is incorporated by reference herein in its entirety.

TECHNICAL FIELD

The present disclosure relates to the field of communications technologies and, in particular, to a method for data transmission, a device for data transmission, a multi-link system, and a storage medium.

BACKGROUND

In a conventional wireless fidelity (Wi-Fi) system, there is only one media access control (MAC) layer and one port physical (PHY) layer (including a radio frequency (RF) link). For a typical Wi-Fi system that supports dual bands (2.4 GHz and 5 GHz), there is generally only one RF link adopted for data transmission. This is an example in which a single link is used in a wireless local area network (WLAN) system.

With the development of wireless local area network (WLAN) standards, in IEEE802.11 EHT and RTA TIG, features of multiple bands (2.4 GHz, 5 GHz, and 60 GHz) or multiple links (also referred to as channels or ch below) have been discussed. Therefore, in actual application, it is quite common that WLAN products (for example, products that support multi-bands and multi-parallel features) support multiple links.

However, current products that support multi-bands and multi-parallel features are only WLAN devices operating in different bands. A MAC layer and a PHY layer are independent from each other between links in these bands. Therefore, in IEEE802.11ad, a fast session transfer (FST) method is adopted. The FST method is an example in which multiple links are used. In the FST method, features of FST are defined, and multiple links in multiple bands including 60 GHz and other bands (2.4 GHz or 5 GHz) are addressed. Specifically, as shown in FIG. 1, in IEEE802.11ad, an FST concept is based on addition of a connection (common upper MAC layer) on two MAC layers (for example, an MAC layer 1 and an MAC layer 2), such that traffic can be managed in a centralized manner in the connection. In this way, seamless transfer can be implemented between different bands or different links. The common upper MAC layer is a combination of an upper MAC layer 1 of the MAC layer 1 and an upper MAC layer 2 of the MAC layer 2.

In such an FST method, attempts are being made to utilize a current single-link design of a WLAN system and seamlessly upgrade the single-link system to a multi-link system with less modification. This is a smooth migration operation with relatively small design workload and relatively low development risks.

However, the efficiency of this method has not been optimized, and there is still much room for improvement.

SUMMARY

In view of this, the present disclosure proposes a method for data transmission, a device for data transmission, a multi-link system, and a storage medium.

According to one aspect of the present disclosure, a method for data transmission is provided and applied to a first device. There is a plurality of links between the first device and a second device. The method includes: determining an available link from the multiple links for data to be transmitted to the second device; and transmitting the data based on a result of transmission right contention of the multiple links.

In a possible implementation, subsequent to the determining an available link from the plurality of links for data to be transmitted to the second device, the method further includes: adding the data to a transmission queue of the available link corresponding to the data, where in the method, under a condition that the data has been transmitted, when the data that is transmitted over one link of the plurality of links is still in a transmission queue of another link, deleting the data from the transmission queue of the another link.

In a possible implementation, the transmitting the data based on a result of transmission right contention of the plurality of links includes: when one link of the plurality of links acquires a transmission right, transmitting the data over the link, and deleting the data from a transmission queue of another link of the plurality of links.

In a possible implementation, prior to the transmitting the data based on a result of transmission right contention of the plurality of links, the method further includes: applying a timeslot shift technique to the plurality of links.

In a possible implementation, the applying a timeslot shift technique to the plurality of links includes: determining, based on timeslot shifts corresponding to the plurality of links, a link that acquires a transmission right for transmitting the data.

In a possible implementation, the data includes access category (AC) data, and the AC data includes at least one of access category voice (AC_VO) data, access category video (AC_VI) data, access category best effort (AC_BE) data, and access category background (AC_BK) data.

In a possible implementation, the transmitting the data based on a result of transmission right contention of the plurality of links includes: when transmission rights are acquired by AC data of different categories in two or more links of the plurality of links at the same time, transmitting the AC data over the two or more links; and/or when transmission rights are acquired by same AC data of a same category in two or more links of the plurality of links at the same time, transmitting the AC data over one link of the two or more links; and/or when transmission rights are acquired by different AC data of a same category in two or more links of the plurality of links at the same time, transmitting the AC data over the two or more links.

In a possible implementation, under a condition that the transmitting the data based on a result of transmission right contention of the plurality of links includes: when transmission rights are acquired by same AC data of a same category in two or more links of the plurality of links at the same time, transmitting the AC data over one link of the two or more links, when the transmission rights are acquired by the same AC data of the same category in the two or more links of the plurality of links at the same time, the method includes: conducting arbitration to determine one link from the two or more links to transmit the AC data.

In a possible implementation, the data includes AC data, and the AC data includes at least one of AC_VO data, AC_VI data, AC_BE data, and AC_BK data.

In a possible implementation, the transmitting the data based on a result of transmission right contention of the plurality of links includes: when transmission rights are acquired by AC data of different categories in two or more links of the plurality of links at the same time, transmitting the AC data over the two or more links, and deleting the AC data from transmission queues of other links of the plurality of links; and/or when transmission rights are acquired by same AC data of a same category in two or more links of the plurality of links at the same time, transmitting the AC data over one link of the two or more links, and deleting the AC from transmission queues of other links of the plurality of links; and/or when transmission rights are acquired by different AC data of a same category in two or more links of the plurality of links at the same time, transmitting the AC data over the two or more links, and deleting the AC data from transmission queues of other links of the plurality of links.

In a possible implementation, under a condition that the transmitting the data based on a result of transmission right contention of the plurality of links includes: when transmission rights are acquired by same AC data of a same category in two or more links of the plurality of links at the same time, transmitting the AC data over one link of the two or more links, and deleting the AC data from transmission queues of other links of the plurality of links, when the transmission rights are acquired by the same AC data of the same category in the two or more links of the plurality of links at the same time, the method includes: conducting arbitration to determine one link from the two or more links to transmit the AC data, and deleting the AC data from transmission queues of other links of the plurality of links.

In a possible implementation, the conducting arbitration to determine one link from the two or more links to transmit the AC data includes: determining, based on priorities of the links, a link for transmitting the AC data; and/or determining, based on an arbitration result obtained in a predetermined arbitration time, a link for transmitting the AC data; and/or determining, based on a link load status of each link that acquires a transmission right, a link for transmitting the AC data.

In a possible implementation, when the data fails to be transmitted over a determined link, the data is transmitted over the determined link again; and/or the first device is an access point (AP), and the second device is a station (STA); or the first device is a STA, and the second device is an AP.

According to another aspect of the present disclosure, a device for data transmission is provided, there is a plurality of links between the device for data transmission and a second device, and the device for data transmission includes: a determining module, configured to determine an available link from the plurality of links for data to be transmitted to the second device; and a transmission module, configured to transmit the data based on a result of transmission right contention of the plurality of links.

In a possible implementation, the device for data transmission further includes: an adding module, configured to add the data to a transmission queue of the available link corresponding to the data, where in the transmission module, under a condition that the data has been transmitted, when the data that is transmitted over one link of the plurality of links is still in a transmission queue of another link, the data is deleted from the transmission queue of the another link.

In a possible implementation, the transmission module is configured to: when one link of the plurality of links acquires a transmission right, transmit the data over the link, and delete the data from a transmission queue of another link of the plurality of links.

In a possible implementation, the device for data transmission further includes: an application module, configured to apply a timeslot shift technique to the plurality of links.

In a possible implementation, the application module is configured to: determine, based on timeslot shifts corresponding to the plurality of links, a link that acquires a transmission right for transmitting the data.

In a possible implementation, the data includes AC data, and the AC data includes at least one of AC_VO data, AC_VI data, AC_BE data, and AC_BK data.

In a possible implementation, the transmission module is configured to: when transmission rights are acquired by AC data of different categories in two or more links of the plurality of links at the same time, transmit the AC data over the two or more links; and/or when transmission rights are acquired by same AC data of a same category in two or more links of the plurality of links at the same time, transmit the AC data over one link of the two or more links; and/or when transmission rights are acquired by different AC data of a same category in two or more links of the plurality of links at the same time, transmit the AC data over the two or more links. In a possible implementation, under a condition that the transmission device is configured to: when transmission rights are acquired by same AC data of a same category in two or more links of the plurality of links at the same time, transmit the AC data over one link of the two or more links, when the transmission rights are acquired by the same AC data of the same category in the two or more links of the plurality of links at the same time, the transmission device specifically conducts arbitration to determine one link from the two or more links to transmit the AC data.

In a possible implementation, the data includes AC data, and the AC data includes at least one of AC_VO data, AC_VI data, AC_BE data, and AC_BK data. In a possible implementation, the transmission module is configured to: when transmission rights are acquired by AC data of different categories in two or more links of the plurality of links at the same time, transmit the AC data over the two or more links, and delete the AC data from transmission queues of other links of the plurality of links; and/or when transmission rights are acquired by same AC data of a same category in two or more links of the plurality of links at the same time, transmit the AC data over one link of the two or more links, and delete the AC data from transmission queues of other links of the plurality of links; and/or when transmission rights are acquired by different AC data of a same category in two or more links of the plurality of links at the same time, transmit the AC data over the two or more links, and delete the AC data from transmission queues of other links of the plurality of links.

In a possible implementation, under a condition that the transmission module is configured to: when transmission rights are acquired by same AC data of a same category in two or more links of the plurality of links at the same time, transmit the AC data over one link of the two or more links, and delete the AC data from transmission queues of other links of the plurality of link, when the transmission rights are acquired by the same AC data of the same category in the two or more links of the plurality of links at the same time, the transmission module is further configured to conduct arbitration to determine one link from the two or more links to transmit the AC data, and deletes the AC data from transmission queues of other links of the plurality of links.

In a possible implementation, the conducting arbitration to determine one link from the two or more links to transmit the AC data includes: determining, based on priorities of the links, a link for transmitting the AC data; and/or determining, based on an arbitration result obtained in a predetermined arbitration time, a link for transmitting the AC data; and/or determining, based on a link load status of each link that acquires a transmission right, a link for transmitting the AC data.

In a possible implementation, when the data fails to be transmitted over a determined link, the transmission module transmits the data over the determined link again; and/or the device for data transmission is an AP, and the second device is a STA; or the device for data transmission is a STA, and the second device is an AP.

According to still another aspect of the present disclosure, a multi-link system is provided, the multi-link system includes a first device and a second device, there is a plurality of links between the first device and the second device, and the first device includes the foregoing device for data transmission.

According to still another aspect of the present disclosure, a device for data transmission is provided, including a processor; and a memory, configured to store a processor-executable instruction, and the processor is configured to implement the foregoing method for data transmission.

According to still another aspect of the present disclosure, a nonvolatile computer-readable storage medium is provided, the computer-readable storage medium stores a computer program instruction, and when being executed by a processor, the foregoing method for data transmission is implemented.

According to the following detailed description of exemplary embodiments with reference to the accompanying drawings, other features and aspects of the disclosure will become clear.

BRIEF DESCRIPTION OF DRAWINGS

The accompanying drawings included in the specification and constituting a part of the specification, together with the specification, illustrate exemplary embodiments, features, and aspects of the disclosure, and are used to explain the principle of the disclosure.

DESCRIPTION OF EMBODIMENTS

Figure 1:
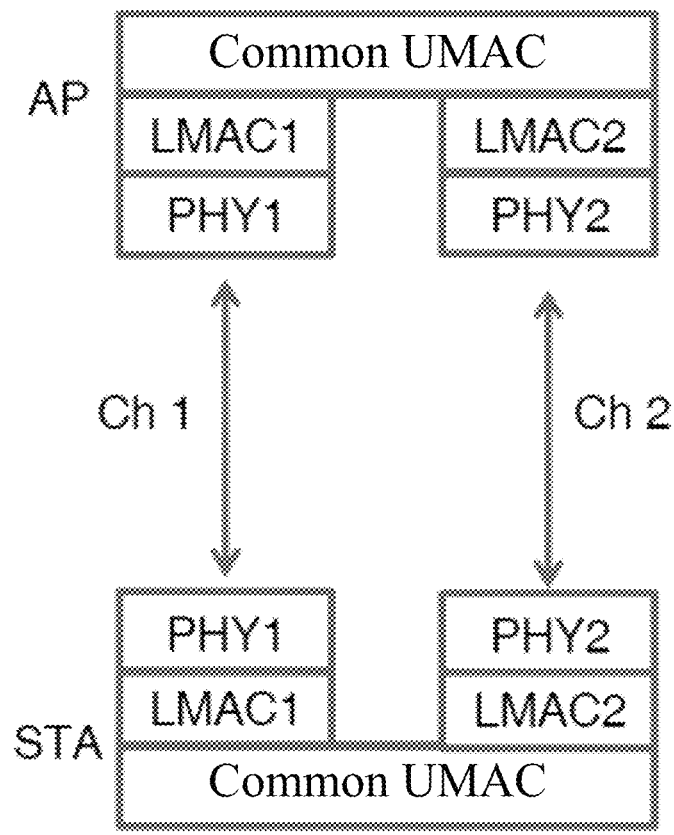
FIG. 1 is a schematic diagram of data transmission processing based on an FST concept.

Various exemplary embodiments, features, and aspects of the disclosure will be described in detail below with reference to the accompanying drawings. The same reference signs in the accompanying drawings indicate elements with the same or similar functions. Although various aspects of the embodiments are shown in the accompanying drawings, unless otherwise noted, the accompanying drawings are not necessarily drawn to scale.

The dedicated word "exemplary" here means "serving as an example, embodiment, or illustration". Any embodiment described herein as "exemplary" does not need to be construed as superior to or better than other embodiments.

In addition, to better illustrate the disclosure, numerous specific details are provided in the following specific implementations. Persons skilled in the art should understand that the disclosure can also be implemented without some specific details. In some examples, the methods, means, elements, and circuits well-known to persons skilled in the art are not described in detail in order to highlight the subject matter of the disclosure.

As described in the background, in such FST method, attempts are being made to utilize a current single-link design of a WLAN system and seamlessly upgrade the single-link system to a multi-link system with less modification. This is a smooth migration step with relatively small design workload and relatively low development risks.

However, in the existing multi-link system to which this method is applied, between an access point (AP) and a station (STA), a link (channel or ch or link) is pre-allocated for data (which is also referred to as packet or data packet below) to be transmitted to a peer end, and then the data is transmitted over the link. However, in actual application, after the link is allocated for the data, the link may be congested, or actual load in the link may change. In other words, the data may not be properly transmitted over the pre-allocated link. In addition, according to the prior-art method for data transmission, link switching cannot be conducted quickly in time. Therefore, this method has poor data transmission efficiency, and there is still much room for improvement.

In view of this, the present disclosure provides a method for data transmission, a device for data transmission, a multi-link system, and a storage medium. In the method for data transmission, between an AP and a STA, data to be transmitted to a peer end is added to a transmission queue of an available link corresponding to the data, without pre-allocating a link for the data. Then, after the data is transmitted over one link of available links, the data is deleted from a transmission queue of another available link. Therefore, in the present disclosure, the data can be transmitted by using all allowed links (available links). This helps to reduce delay. In addition, each link can be better utilized dynamically. For example, under a condition that a link is congested, data that supports multiple links is automatically transmitted by using other links, thereby improving the data transmission efficiency. In addition, for example, under a condition that there is low load in a link, data that supports the link can be automatically transferred to the link to be transmitted, such that the data can be automatically transmitted by using the link with low load. This can also improve the data transmission efficiency.

The method for data transmission, the device for data transmission, the multi-link system, and the storage medium in the present disclosure are described below in detail with reference to embodiments.

Figure 2:
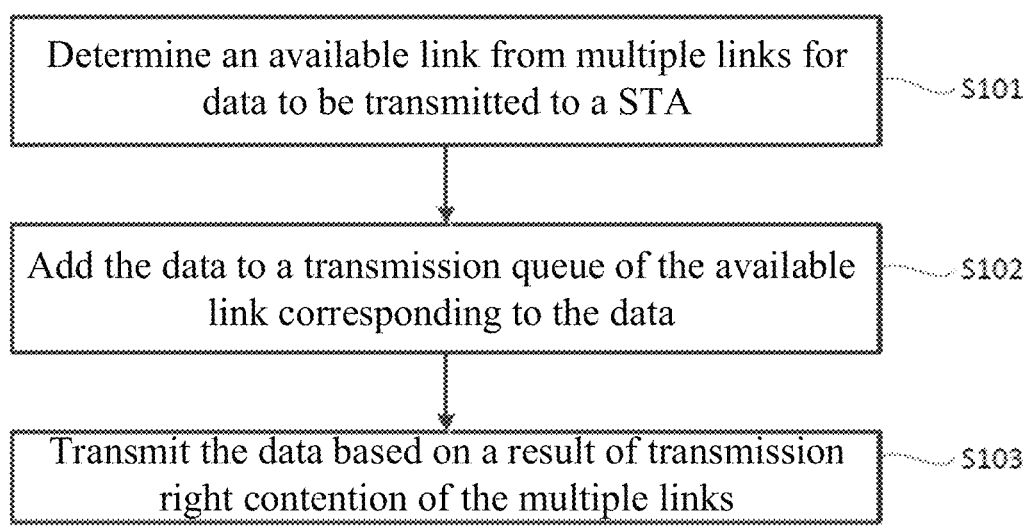
FIG. 2 is a flowchart of a method for data transmission according to an embodiment of the present disclosure.

FIG. 2 is a flowchart of a method for data transmission according to an embodiment of the present disclosure. The method may be applied to an AP, or may be applied to a STA. In the following, the method being applied to an AP is mainly used for description. There may be multiple links between the AP and a STA, and each link may exist in a 2.4 GHz band, a 5 GHz band, a 6 GHz band, or a 60 GHz band. It is appreciated that, each link in the present disclosure may alternatively exist in a band other than the foregoing bands. In the following, that there are two links between the AP and the STA (for example, a link 1 exists in a 2.4 GHz or 5 GHz band and a link 2 exists in a 6 GHz band) is used for description. In addition, one AP is generally corresponding to one or more STAs. In the following, that one AP is corresponding to four STAs (a STA1, a STA2, a STA3, and a STA4) is mainly used for description.

As shown in FIG. 2, the method for data transmission mainly includes the following steps:

S101. Determine an available link from the multiple links for data to be transmitted to the STA.

S102. Add the data to a transmission queue of the available link corresponding to the data.

S103. Transmit the data based on a result of transmission right contention of the multiple links, when the data that is transmitted over one link of the multiple links is still in a transmission queue of another link, delete the data from the transmission queue of the another link.

For S101, the AP first determines data to be transmitted to one or more STAs. For example, the data includes AC data (also referred to as AC packet or AC data packet below). It is appreciated that, the data may also include other categories of data. In the following examples, the data being AC data is mainly used for description. In a possible implementation, the AC data includes at least one of AC_VO data (voice data), AC_VI data (video data), AC_BE data (best effort data), and AC_BK data (background data). A transmission priority order (link transmission right probabilities) of these four categories of data is AC_VO>AC_VI>AC_BE>AC_BK. For example, the AP may transmit data to the STA1, the STA2, the STA3, and the STA4. The AP transmits the AC_VO data to the STA1 and the STA3 according to a specific order, transmits the AC_VI data to the STA4 and the STA2 according to a specific order, transmits the AC_BE data to the STA1, the STA2, the STA3, and the STA4 according to a specific order, and transmits the AC_BK data to the STA4, the STA3, the STA2, and the STA1 according to a specific order. It should be noted that categories of AC data and transmission priorities of the AC data that are described above are the same as those specified in the existing IEEE 802.11 protocol. Details are not described herein.

Then, in S101, for the determined AC data to be transmitted to the STA, the AP determines, from multiple links (that is, a link 1 and a link 2) between the AP and the STA, available links corresponding to the AC data.

For example, all AC data to be transmitted to all STAs (that is, the STA1, the STA2, the STA3, and the STA4) may support the link 1 and the link 2. In other words, each STA may support the link 1 and the link 2. In this case, the AP determines the link 1 and the link 2 as available links for all the AC data.

For another example, AC data to be transmitted to the STA1 may only support the link 1, AC data to be transmitted to the STA4 may only support the link 2, and AC data to be transmitted to the STA2 and the STA3 may support the link 1 and the link 2. In other words, the STA1 supports the link 1, the STA4 supports the link 2, and the STA2 and the STA3 support the link 1 and the link 2. In this case, for the AC data to be transmitted to the STA1, the link 1 is determined as an available link; for the AC data to be transmitted to the STA4, the link 2 is determined as an available link; and for the AC data to be transmitted to the STA2 and the STA3, the link 1 and the link 2 are both determined as available links.

For another example, AC_VO data and AC_VI data to be transmitted to the STA1 may only support the link 1, and AC_BE data and AC_BK data to be transmitted to the STA1 may only support the link 2. In this case, for the AC_VO data and the AC_VI data to be transmitted to the STA1, the link 1 is determined as an available link; and for the AC_BE data and the AC_BK data to be transmitted to the STA1, the link 2 is determined as an available data. The foregoing only uses categories of AC data to be transmitted to the STA1 as an example for description, and this is also applicable to categories of AC data to be transmitted to other STAs.

The foregoing only provides some examples of determining an available link, but the present disclosure is not limited thereto. An available link may be determined for AC data according to specific cases (for example, according to possible cases such as AC data to be transmitted to each STA and categories of the AC data to be transmitted to each STA). For example, in an embodiment, different available links may be set for any data (AC data or AC packet) to be transmitted to any STA.

For S102, after the available link is determined for the AC data, the AC data is added to a transmission queue of the available link corresponding to the AC data.

In an embodiment, for example, when all AC data to be transmitted to all STAs (that is, the STA1, the STA2, the STA3, and the STA4) supports the link 1 and the link 2 (in other words, each STA supports the link 1 and the link 2), the AP adds all the AC data to transmission queues of the link 1 and the link 2. In this case, the AC data may be transmitted to each STA over the link 1, or may be transmitted to each STA over the link 2.

For another example, when AC data to be transmitted to the STA1 only supports the link 1, AC data to be transmitted to the STA4 only supports the link 2, and AC data to be transmitted to the STA2 and the STA3 supports the link 1 and the link 2, the AP adds to a transmission queue of the link 1 the AC data to be transmitted the STA1, adds to a transmission queue of the link 2 the AC data to be transmitted to the STA4, and adds to transmission queues of the link 1 and the link 2 the AC data to be transmitted to the STA2 and the STA3. In this way, the AC data to be transmitted to the STA1 may be transmitted to the STA1 only over the link 1, the AC data to be transmitted to the STA4 may be transmitted to the STA2 only over the link 2, and the AC data to be transmitted to the STA2 and the STA3 may be correspondingly transmitted to the STA2 and the STA3 over both the link 1 and the link 2.

For still another example, when AC_VO data and AC_VI data to be transmitted to the STA1 only support the link 1, and AC_BE data and AC_BK data to be transmitted to the STA1 only support the link 2, the AC_VO data and the AC_VI data to be transmitted to the STA1 are only added to a transmission queue of the link 1, and the AC_BE data and the AC_BK data to be transmitted to the STA1 are only added to a transmission queue of the link 2. In this way, the AC_VO data and the AC_VI data to be transmitted to the STA1 may be transmitted to the STA1 only over the link 1, and the AC_BE data and the AC_BK data to be transmitted to the STA1 may be transmitted to the STA1 only over the link 2.

Then, for S103, in the AP, the multiple links conduct transmission right contention in each time period, and then the AP selects, based on a result of transmission right contention of the multiple links and from available links corresponding to the AC data, an appropriate available link to transmit the AC data; and under a condition that the AC data is still in a transmission queue of another link, then deletes the AC data from the transmission queue of the another link.

In an embodiment, for example, under a condition that AC_VO data in the link 1 to be transmitted to the STA1 wins transmission right contention conducted for the first time, that is, a transmission right is acquired by the AC_VO data, the AP transmits the AC_VO data to the STA1 over the link 1; and under a condition that the AC_VO data is still in a transmission queue of the link 2 (in other words, the link 2 is also an available link corresponding to the AC_VO data), the AP deletes the AC_VO data from the transmission queue of the link 2.

For another example, under a condition that AC_VI data in the link 2 to be transmitted to the STA4 wins transmission right contention conducted for the second time, that is, a transmission right is acquired by the AC_VI data, the AP transmits the AC_VI data to the STA4 over the link 2; and under a condition that the AC_VI data is still in a transmission queue of the link 1 (in other words, the link 1 is also an available link corresponding to the AC_VI data), the AP deletes the AC_VI data from the transmission queue of the link 1.

Similarly, the AP sequentially transmits corresponding AC data to the STAs over a link that acquires a transmission right, and under a condition that the AC data is still in a transmission queue of another link, the AP deletes the AC data from the transmission queue of the another link.

It should be noted that the foregoing description provides specific examples only for describing the steps (that is, S101 to S103) of the foregoing method for data transmission, but the present disclosure is not limited thereto. The foregoing method for data transmission in the embodiments of the present disclosure may be applied according to specific cases of a link between the AP and the STA and to-be-transmitted data between the AP and the STA.

In addition, the foregoing description is provided mainly by using AC data as an example of data in the present disclosure, but the present disclosure is not limited thereto. Moreover, based on an actual application scenario, the data to be transmitted over the present disclosure may be data of other categories.

In addition, in the foregoing description, the data being transmitted from the AP to the STA is mainly used for description. However, in the present disclosure, the foregoing method for data transmission can also be applied to data transmitted from the STA to the AP.

In addition, in the foregoing description, the case that there are two links between the AP and the STA is mainly used for description. However, in the present disclosure, there may be three or more links (the link 1, the link 2, a link 3, . . . ) between the AP and the STA, and the foregoing method for data transmission can also be applied thereto.

In addition, in the foregoing, that one AP is corresponding to four STAs is mainly used for description. However, one AP may be corresponding to another quantity of STAs (for example, one, two, three, or more than five STAs).

In addition, in the present disclosure, the foregoing multiple links may exist in a same band. For example, when there are three links (the link 1, the link 2, and the link 3), the link 1, the link 2, and the link 3 may all exist in a 2.4 GHz band; the link 1, the link 2, and the link 3 may all exist in a 5 GHz band; the link 1, the link 2, and the link 3 may all exist in a 6 GHz band; or the link 1, the link 2, and the link 3 may all exist in a 60 GHz band. In addition, in the present disclosure, the foregoing multiple links may alternatively exist in different bands. For example, the link 1 may exist in the 2.4 GHz band, the link 2 may exist in the 5 GHz band, and the link 3 may exist in the 60 GHz band. For another example, the link 1 and the link 2 may exist in the 2.4 GHz band, and the link 3 may exist in the 60 GHz band. Regardless of whether the multiple links exist in a same band or in different bands, the foregoing method for data transmission can also be applied thereto.

Therefore, according to the method for data transmission in the embodiments of the present disclosure, the data to be transmitted may be added to a transmission queue of an available link corresponding to the data, without pre-allocating a link for the data. Then, the data is transmitted based on a result of transmission right contention of links, and after the data is transmitted over a link, the data that is still in a transmission queue of another link is deleted. In this way, according to the method for data transmission in the present disclosure, the data can be transmitted by using all allowed links (available links). This helps to reduce delay. In addition, each link can be better used dynamically. For example, under a condition that one link is congested, data that supports multiple links is automatically transmitted by using other links, thereby improving the data transmission efficiency. In addition, for example, under a condition that there is low load in a link, AC data that supports the link can be automatically transferred to the link for transmission, such that the data can be automatically transmitted by using the link with low load. This can also improve the data transmission efficiency.

The following details the method for data transmission in the present disclosure by using specific examples.

In the following examples, AC data is used as an example of data in the present disclosure for description. However, persons skilled in the art can know that other categories of data can also be applied to the method for data transmission. In addition, for the convenience of description below, AC_VO data, AC_VI data, AC_BE data, and AC_BK data in AC data may respectively be referred to as VO data, VI data, BE data, and BK data for short; AC_VO data, AC_VI data, AC_BE data, and AC_BK data in the link 1 (ch1) may respectively be referred to as VO1 data, VI1 data, BE1 data, and BK1 data for short; and AC_VO data, AC_VI data, AC_BE data, and AC_BK data in the link 2 (ch2) are respectively referred to as VO2 data, VI2 data, BE2 data, and BK2 data for short. In addition, for AC_VO data in a specific link, the order of AC_VO data transmission may be AC_VO(1), AC_VO(2), AC_VO(3), and AC_VO(4), or VO(1), VO(2), VO(3) and VO(4). This is also applicable to the AC_VI data, the AC_BE data, and the AC_BK data.

Figure 3:
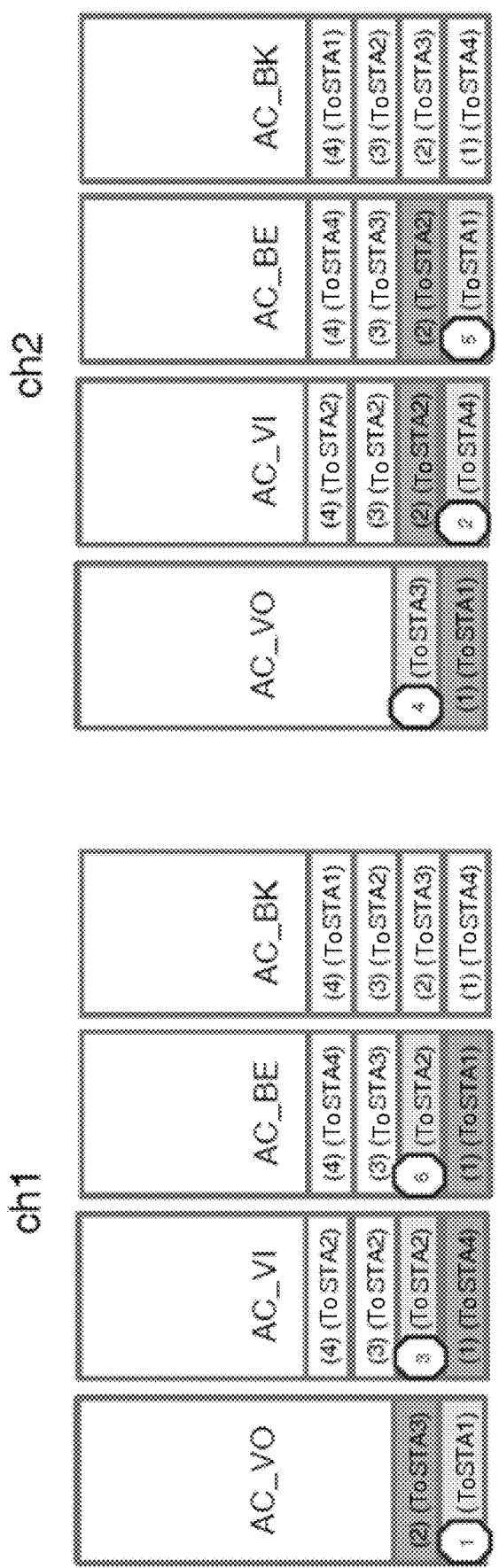
FIG. 3 is a diagram of an example of a method for data transmission according to an embodiment of the present disclosure.

FIG. 3 is a diagram of an example of a method for data transmission according to an embodiment of the present disclosure. In this example, the method for data transmission is applied to an AP, that is, data is transmitted from the AP to a STA. The method for data transmission in this example can also be applied to the STA. As shown in FIG. 3, all AC data (AC_VO data, AC_VI data, AC_BE data, and AC_BK data) to be transmitted to STAs (that is, a STA1, a STA2, a STA3, and a STA4) supports both a link 1 (ch1) and a link 2 (ch2). Therefore, in S102, all the AC data to be transmitted to the STAs is added to transmission queues of ch1 and ch2. In addition, in FIG. 3, VO1 data, VI2 data, VI1 data, VO2 data, BE2 data, and BE1 data sequentially win transmission right contention of the links, that is, obtain links through contention. Therefore, in S103, an order in which the AP transmits the data to the STAs is as follows: (1) The AP transmits, over ch1, the VO data to be transmitted to the STA1, and deletes the data from a transmission queue of ch2; (2) The AP transmits, over ch2, the VI data to be transmitted to the STA4, and deletes the data from a transmission queue of ch1; (3) The AP transmits, over ch1, the VI data to be transmitted to the STA2, and deletes the data from a transmission queue of ch2; (4) The AP transmits, over ch2, the VO data to be transmitted to the STA3, and deletes the data from a transmission queue of ch1; (5) The AP transmits, over ch2, the BE data to be transmitted to the STA1, and deletes the data from a transmission queue of ch1; (6) The AP transmits, over ch1, the BE data to be transmitted to the STA2, and deletes the data from a transmission queue of ch2. That is, for the transmitted AC data, the AC data (a dark part) is deleted from a transmission queue of another link. In other words, because the AC data transmitted in (1) to (6) is still in a transmission queue of another link, these AC data (dark parts) are sequentially deleted from transmission queues of other links.

In addition, in the foregoing example, all the AC data to be transmitted to the STAs supports multiple links. However, there may be a case in which AC data to be transmitted some STAs does not support a specific link.

Figure 4:
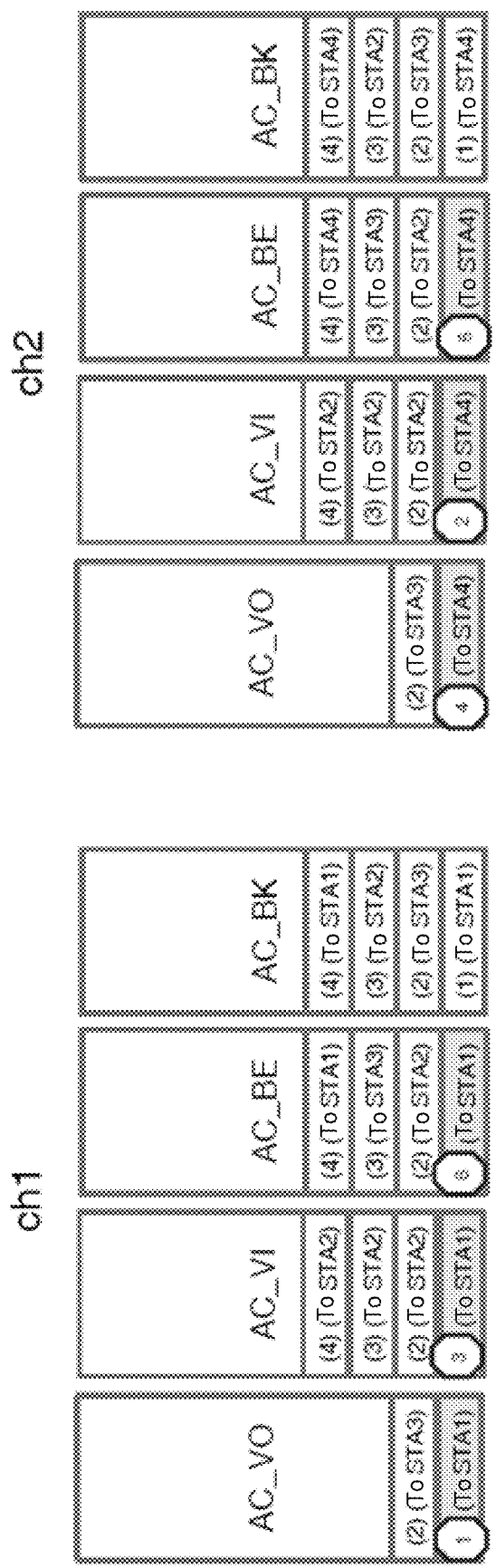
FIG. 4 is a diagram of another example of a method for data transmission according to an embodiment of the present disclosure.

FIG. 4 is a diagram of another example of a method for data transmission according to an embodiment of the present disclosure. In this example, the method for data transmission is applied to an AP, that is, data is transmitted from the AP to a STA. The method for data transmission in this example can also be applied to the STA. As shown in FIG. 4, AC data to be transmitted to a STA1 only supports ch1 (that is, the STA1 only supports ch1), AC data to be transmitted to a STA4 only supports ch2 (that is, the STA4 only supports ch2), and AC data to be transmitted to other STAs supports both ch1 and ch2 (that is, a STA2 and a STA3 support both ch1 and ch2). Therefore, in S102, the AC data to be transmitted to the STA1 is only added to a transmission queue of ch1, the AC data to be transmitted to the STA4 is only added to a transmission queue of ch2, and the AC data to be transmitted to the STA2 and the STA3 is added to transmission queues of ch1 and ch2. In addition, as shown in FIG. 4, VO1 data, VI2 data, VI1 data, VO2 data, BE2 data, and BE1 data sequentially win transmission right contention of the links. Correspondingly, in S103, an order in which the AP transmits the AC data to the STAs is as follows: (1) The AP transmits, over ch1, the VO data to be transmitted to the STA1; (2) The AP transmits, over ch2, the VI data to be transmitted to the STA4; (3) The AP transmits, over ch1, the VI data to be transmitted to the STA1; (4) The AP transmits, over ch2, the VO data to be transmitted to the STA4; (5) The AP transmits, over ch2, the BE data to be transmitted to the STA4; (6) The AP transmits, over ch1, the BE data to be transmitted to the STA1. Because none of the AC data transmitted in (1) to (6) exists in a transmission queue of another link, no delete operation needs to be conducted.

Figure 5:
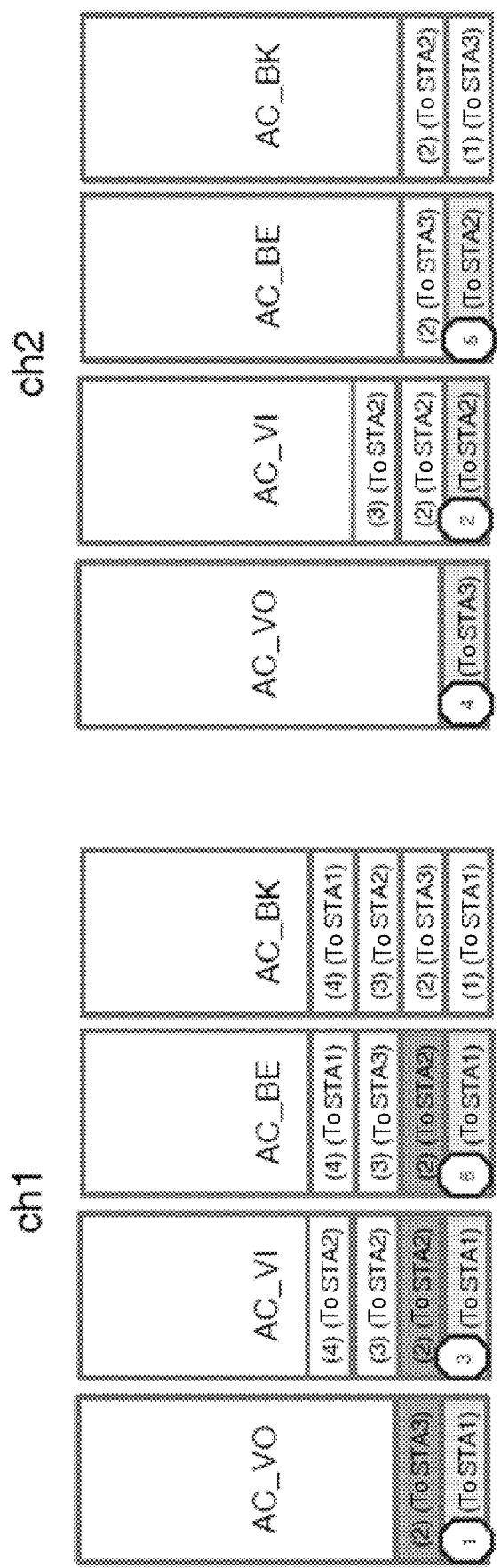
FIG. 5 is a diagram of still another example of a method for data transmission according to an embodiment of the present disclosure.

FIG. 5 is a diagram of still another example of a method for data transmission according to an embodiment of the present disclosure. In this example, the method for data transmission is applied to an AP, that is, data is transmitted from the AP to a STA. The method for data transmission in this example can also be applied to the STA. As shown in FIG. 5, AC data to be transmitted to a STA1 only supports ch1, and AC data to be transmitted to other STAs (that is, a STA2, a STA3, and a STA4) supports both ch1 and ch2. Therefore, in S102, the AC data to be transmitted to the STA1 is only added to a transmission queue of ch1, and the AC data to be transmitted to the other STAs (that is, the STA2, the STA3, and the STA4) is added to transmission queues of ch1 and ch2. In addition, as shown in FIG. 5, VO1 data, VI2 data, VI1 data, VO2 data, BE2 data, and BE1 data sequentially obtain links through transmission right contention of the links. Therefore, in S103, an order in which the AP transmits the AC data to the STAs is as follows: (1) The AP transmits, over ch1, the VO data to be transmitted to the STA1; (2) The AP transmits, over ch2, the VI data to be transmitted to the STA2, and deletes the data from a transmission queue of ch1; (3) The AP transmits, over ch1, the VI data to be transmitted to the STA1; (4) The AP transmits, over ch2, the VO data to be transmitted to the STA3, and deletes the data from a transmission queue of ch1; (5) The AP transmits, over ch2, the BE data to be transmitted to the STA2, and deletes the data from a transmission queue of ch1; (6) The AP transmits, over ch1, the BE data to be transmitted to the STA1. Because none of the AC data transmitted in (1), (3), and (6) exists in a transmission queue of another link, no delete operation needs to be conducted. In addition, because the AC data transmitted in (2), (4), and (5) is still in a transmission queue of another link, these AC data (dark parts) are sequentially deleted from the other links.

In addition, in some cases, AC data to be transmitted to some STAs may only support a specific link, and some AC data to be transmitted to some STAs may also only support a specific link.

Figure 6:
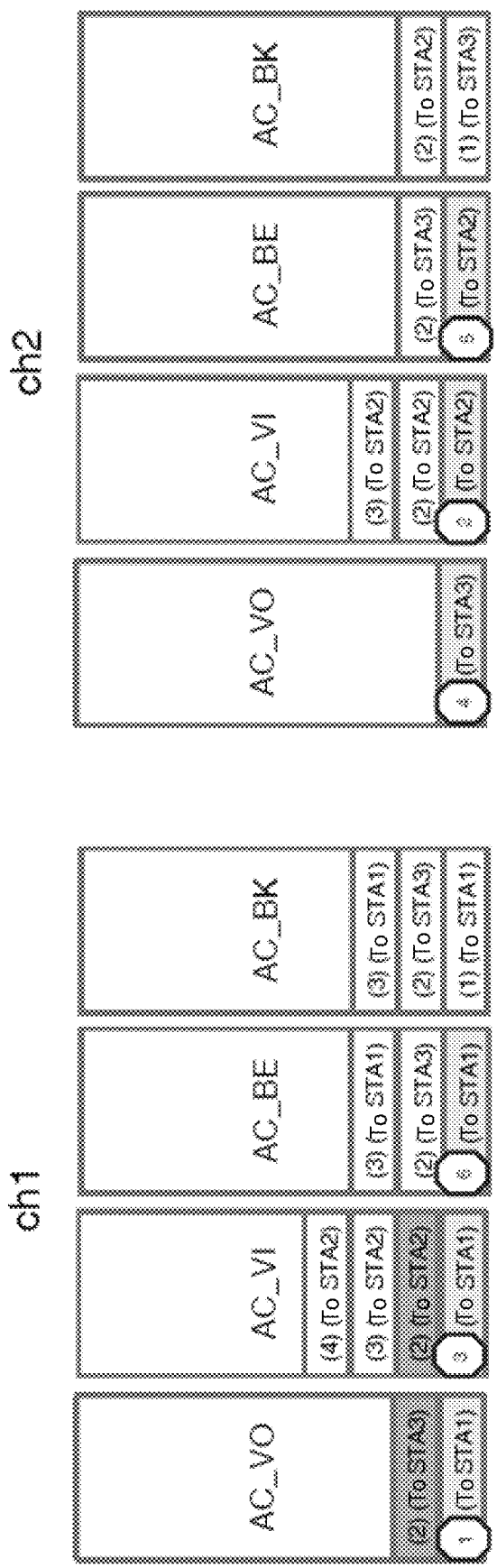
FIG. 6 is a diagram of still another example of a method for data transmission according to an embodiment of the present disclosure.

FIG. 6 is a diagram of still another example of a method for data transmission according to an embodiment of the present disclosure. In this example, the method for data transmission is applied to an AP, that is, data is transmitted from the AP to a STA. The method for data transmission in this example can also be applied to the STA. As shown in FIG. 6, a STA1 only supports ch1, VO data and VI data to be transmitted to a STA2 support ch1 and ch2, BE data and BK data to be transmitted to the STA2 only support ch2, and other STAs (that is, a STA3 and a STA4) support both ch1 and ch2. Therefore, in S102, AC data to be transmitted to the STA1 is only added to transmission queues of ch1, AC data to be transmitted to the STA3 and the STA4 is added to transmission queues of ch1 and ch2, and the VO data and the VI data to be transmitted to the STA2 are added to transmission queues of ch1 and ch2, and the BE data and the BK data to be transmitted to the STA2 are only added to transmission queues of ch2. In addition, as shown in FIG. 6, VO1 data, VI2 data, VI1 data, VO2 data, BE2 data, and BE1 data sequentially acquires links through transmission right contention of the links. Correspondingly, in S103, an order in which the AP transmits the AC data to the STAs is as follows: (1) The AP transmits, over ch1, the VO data to be transmitted to the STA1; (2) The AP transmits, over ch2, the VI data to be transmitted to the STA2, and deletes the data from a transmission queue of ch1; (3) The AP transmits, over ch1, the VI data to be transmitted to the STA1; (4) The AP transmits, over ch2, the VO data to be transmitted to the STA3, and deletes the data from a transmission queue of ch1; (5) The AP transmits, over ch2, the BE data to be transmitted to the STA2; (6) The AP transmits, over ch1, the BE data to be transmitted to the STA1. In addition, for the AC data transmitted in (1), (3), (5), and (6), there is no corresponding AC data in another link, and therefore no delete operation needs to be conducted. For the AC data transmitted in (2) and (4), there is corresponding AC data in another link, and therefore these AC data (dark parts) are deleted from transmission queues of the other links.

In the foregoing example, only one link acquires a transmission right during transmission right contention of the links. In this case, according to the method for data transmission in the present disclosure, data is transmitted over a link that acquires a transmission right, and the data that is still in a transmission queue of another link is deleted. In other words, in the method for data transmission in the present disclosure, based on a result of transmission right contention of multiple links, when only one link of the multiple links acquires a transmission right, data is transmitted over the link, and the data is deleted from a transmission queue of another link of the multiple links.

In a possible implementation, there may be the following case: two or more links acquire transmission rights at the same time during transmission right contention of links.

Transmission rights are acquired by AC data of different categories in the two or more links at the same time. In this case, the AC data is transmitted over the two or more links, and the AC data that is still in transmission queues of other links of multiple links is deleted.

Figure 7:
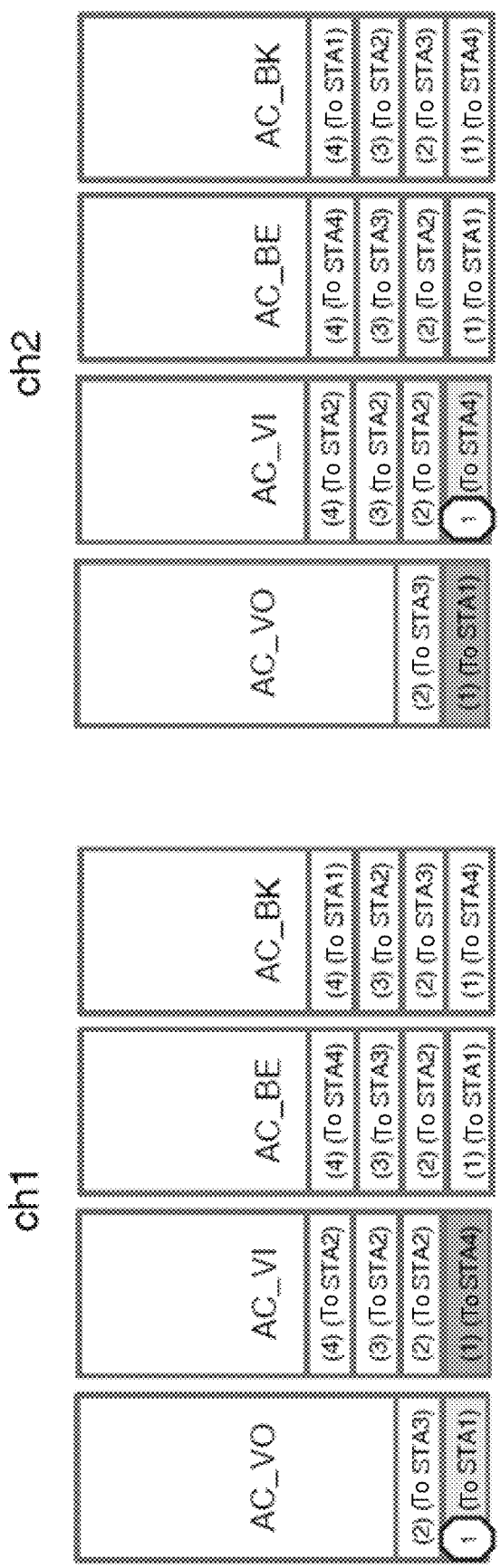
FIG. 7 is a diagram of still another example of a method for data transmission according to an embodiment of the present disclosure.

FIG. 7 is a diagram of still another example of a method for data transmission according to an embodiment of the present disclosure. The method for data transmission is applied to an AP, that is, data is transmitted from the AP to a STA. The method for data transmission in this example can also be applied to the STA. As shown in FIG. 7, all AC data (AC_VO data, AC_VI data, AC_BE data, and AC_BK data) to be transmitted to STAs (that is, a STA1, a STA2, a STA3, and a STA4) supports both ch1 and ch2. Therefore, in S102, all the AC data to be transmitted to the STAs is added to transmission queues of ch1 and ch2. In addition, in FIG. 7, the AC_VO data in ch1 to be transmitted to the STA1 and the AC_VI data in ch2 to be transmitted to the STA4 win transmission right contention of links at the same time, that is, obtain the links at the same time through contention. In view of this, because categories of AC data to be transmitted over different links are different, these two categories of data can be transmitted at the same time. To be specific, the AC_VO data to be transmitted to the STA1 is transmitted over ch1, and the AC_VI data to be transmitted to the STA4 is transmitted over ch2. In addition, for transmitted data, the data (a dark part) is deleted from a transmission queue of another link.

It is appreciated that, only an example is provided in the foregoing, and the present disclosure is not limited thereto. For example, VO1 data and BE2 data may obtain links at the same time through contention, or BE1 data and BK2 data may obtain links at the same time through contention. The foregoing examples can also be applied to the foregoing method for data transmission.

In addition, in the foregoing examples, all AC data to be transmitted to the STAs supports both ch1 and ch2 (corresponding to FIG. 3), all AC data to be transmitted to the STAs may only support a part of links (corresponding to FIG. 4 and FIG. 5), or some AC data of a STA may only support a part of links (corresponding to FIG. 6). In all these cases, the method for data transmission in FIG. 7 can also be applied.

In a possible implementation, there may be the following case: same AC data of a same category in different links obtains links at the same time through contention. In this case, the AC data is transmitted over one of the links, and the AC data is deleted from a transmission queue of another link.

Figure 8:
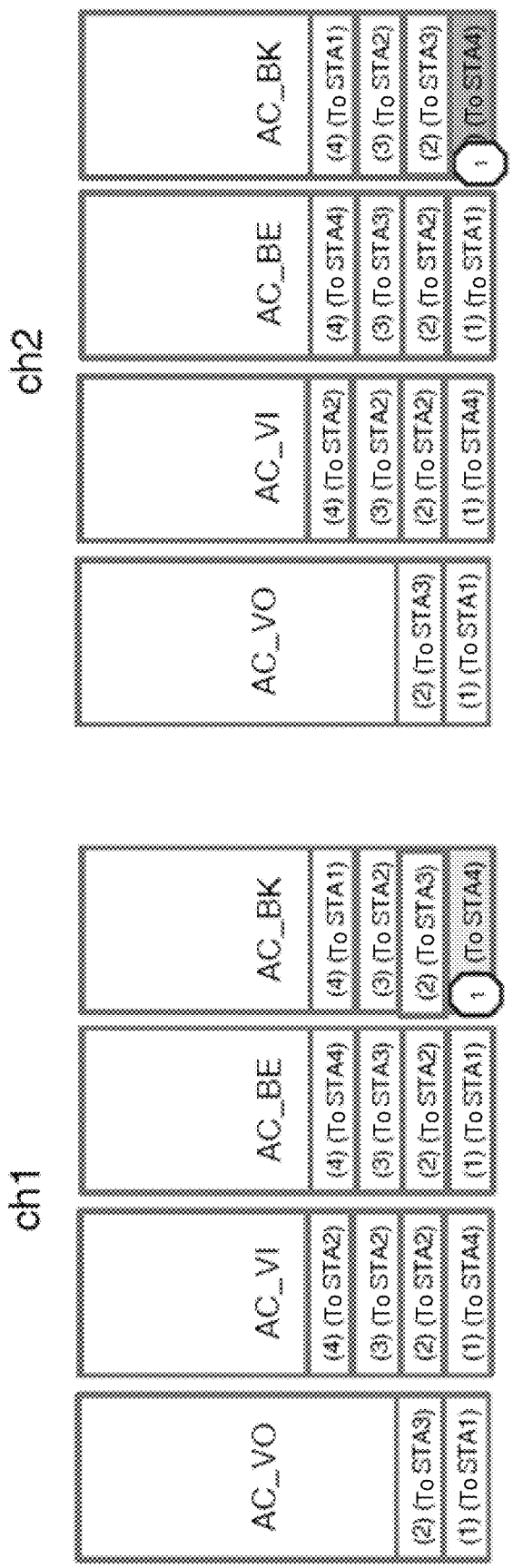
FIG. 8 is a diagram of still another example of a method for data transmission according to an embodiment of the present disclosure.

FIG. 8 is a diagram of still another example of a method for data transmission according to an embodiment of the present disclosure. The method for data transmission is applied to an AP, that is, data is transmitted from the AP to a STA. The method for data transmission in this example can also be applied to the STA. As shown in FIG. 8, all AC data (AC_VO data, AC_VI data, AC_BE data, and AC_BK data) to be transmitted to STAs (that is, a STA1, a STA2, a STA3, and a STA4) supports both ch1 and ch2. Therefore, in S102, all the AC data to be transmitted to the STAs is added to transmission queues of ch1 and ch2. In addition, in FIG. 8, the AC_BK data in ch1 to be transmitted to the STA4 and the AC_BK data in ch2 to be transmitted to the STA4 win transmission right contention of links at the same time, that is, obtain the links at the same time through contention. In view of this, because AC data to be transmitted over different links is of a same category and is same AC data, one of the links can be selected to transmit the AC data, and the AC data is deleted from a transmission queue of the other link. For example, as shown in FIG. 8, the AP may transmit the AC_BK data to the STA4 over ch1, and delete the AC_BK data (a dark part) from a transmission queue of ch2.

In a possible implementation, when same AC data of a same category in different links acquires links at the same time through contention, a link for transmitting the AC data may be determined according to at least one of the following manners.

In a first manner, the link for transmitting the AC data may be determined based on priorities of the links. For example, the priorities of the links may be preset for the links. For example, a link with a high priority may be selected to transmit the AC data, and the AC data that is still in a transmission queue of another link may be deleted. In this way, a case in which the same AC data is transmitted over the two or more links at the same time can be avoided based on the priorities preset for the links.

Figure 9:
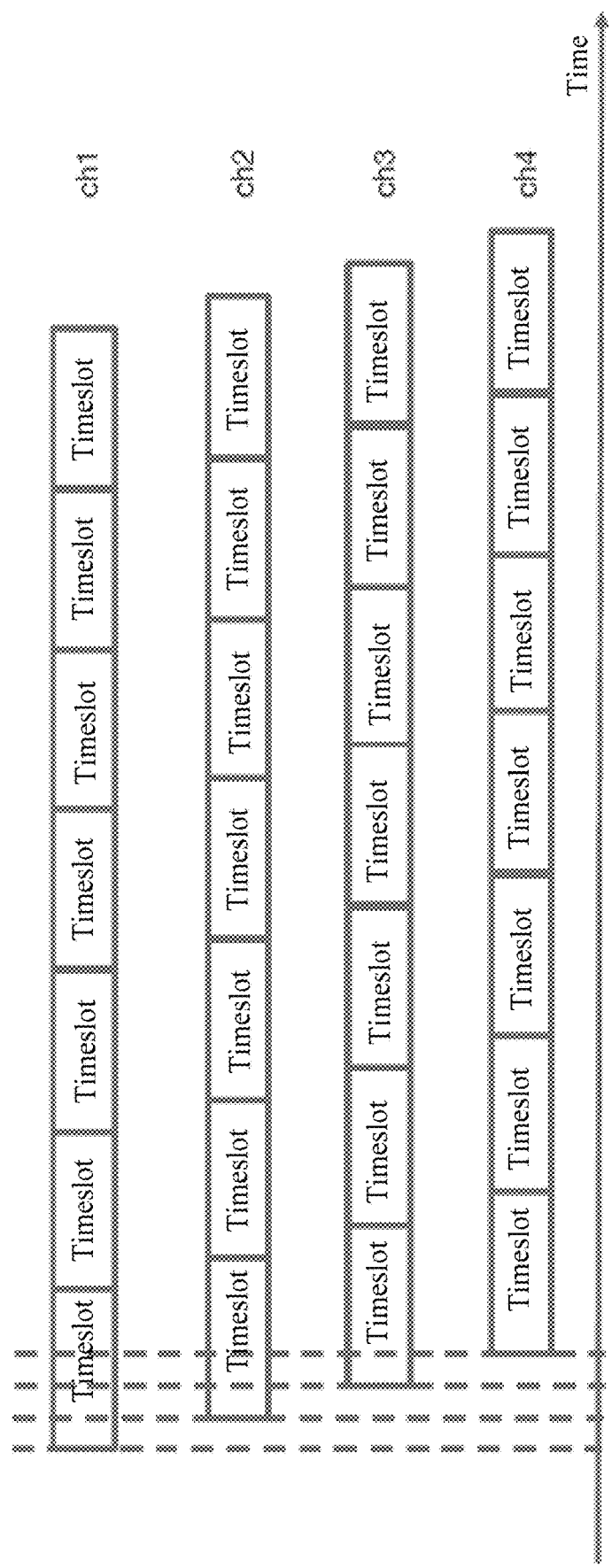
FIG. 9 is a diagram of a configuration example of a timeslot shift according to an embodiment of the present disclosure.

In a second manner, the link for transmitting the AC data may be determined based on timeslot shifts corresponding to the links. The timeslot shifts may be preset for the links. FIG. 9 is a diagram of a configuration example of a timeslot shift according to an embodiment of the present disclosure. As shown in FIG. 9, in all links, start points of time slots are different from each other, that is, there are different timeslot shifts. In an embodiment, in FIG. 9, in ch1, ch2, ch3, and ch4, a time order of the start points corresponding to the timeslot shifts is sequentially ch1, ch2, ch3, and ch4. Since the start points corresponding to the timeslot shifts are different, in each timeslot, only one link can obtain an opportunity for transmitting AC data. For example, ch1 in which a start point corresponding to a timeslot shift is earliest may be selected to transmit the AC data, and the AC data that is still in a transmission queue of another link may be deleted. In this way, a case in which the same AC data is transmitted over the two or more links at the same time can be avoided based on the timeslot shifts preset for the links.

Figure 10:
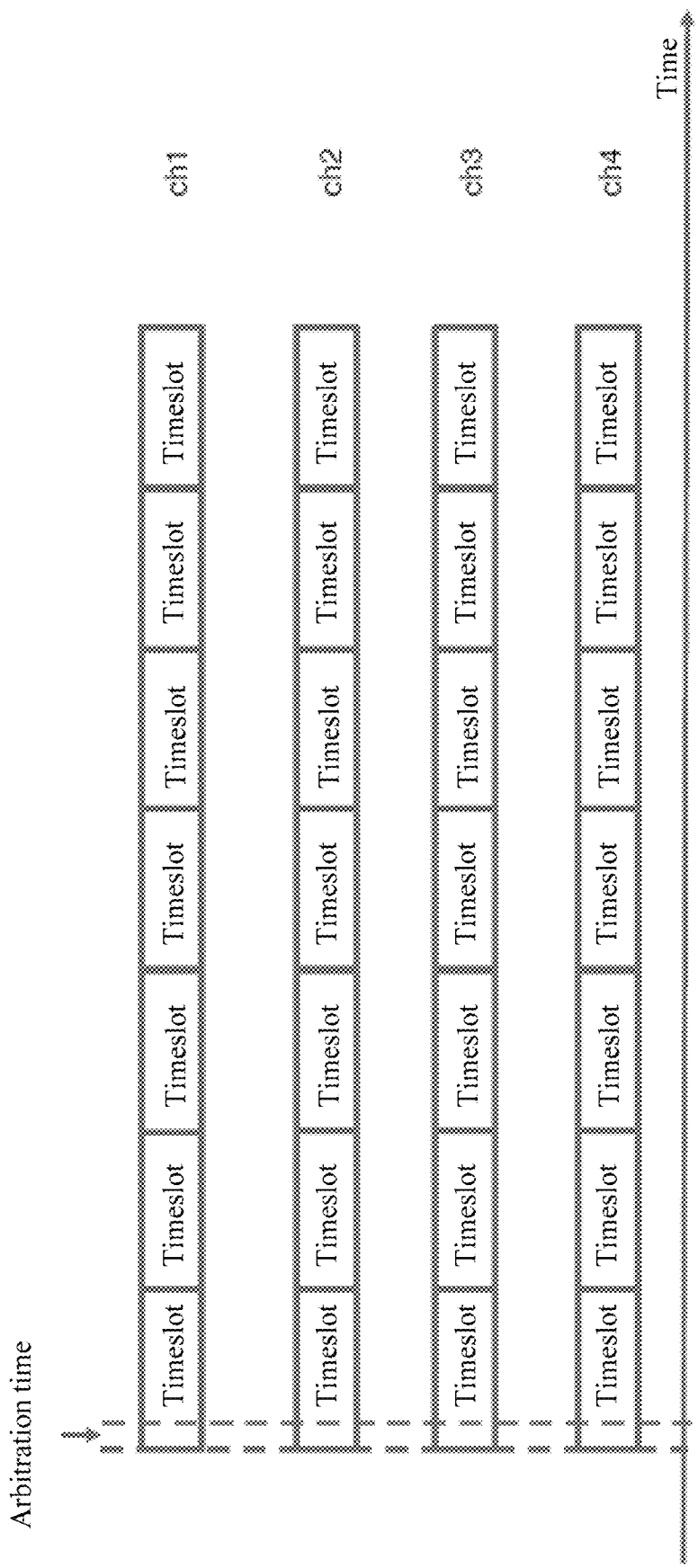
FIG. 10 is a diagram of a configuration example of an arbitration time according to an embodiment of the present disclosure.

In a third manner, the link for transmitting the AC data may be determined based on an arbitration result that is obtained in a predetermined arbitration time. In a case in which same AC data of a same category obtains links through contention, a specific link over which the AC data is to be transmitted may be determined in the arbitration time. FIG. 10 is a diagram of a configuration example of an arbitration time according to an embodiment of the present disclosure. As shown in FIG. 10, there are four links ch1, ch2, ch3, and ch4 between an AP and a STA, and a vertical arrow indicates an arbitration time set for each link. In the arbitration time, the AP may determine a specific link over which the AC data is to be transmitted, and delete the AC data from a transmission queue of another link.

In a fourth manner, the link for transmitting the AC data may be determined based on a link load status of each link that acquires a transmission right. For example, a link with low load may be selected from all the links that acquire transmission rights to transmit the AC data, and the AC data may be deleted from a transmission queue of another link.

It should be noted that, in the foregoing method for data transmission, one of the foregoing four manners may be used, or a combination of multiple manners in the foregoing four manners may be used.

In addition, in a possible implementation, there may be the following case: different AC data of a same category in different links obtain links at the same time through contention. In this case, the AC data may be transmitted over the two or more links, and the AC data that is still in a transmission queue of another link of the multiple links may be deleted.

Figure 11:
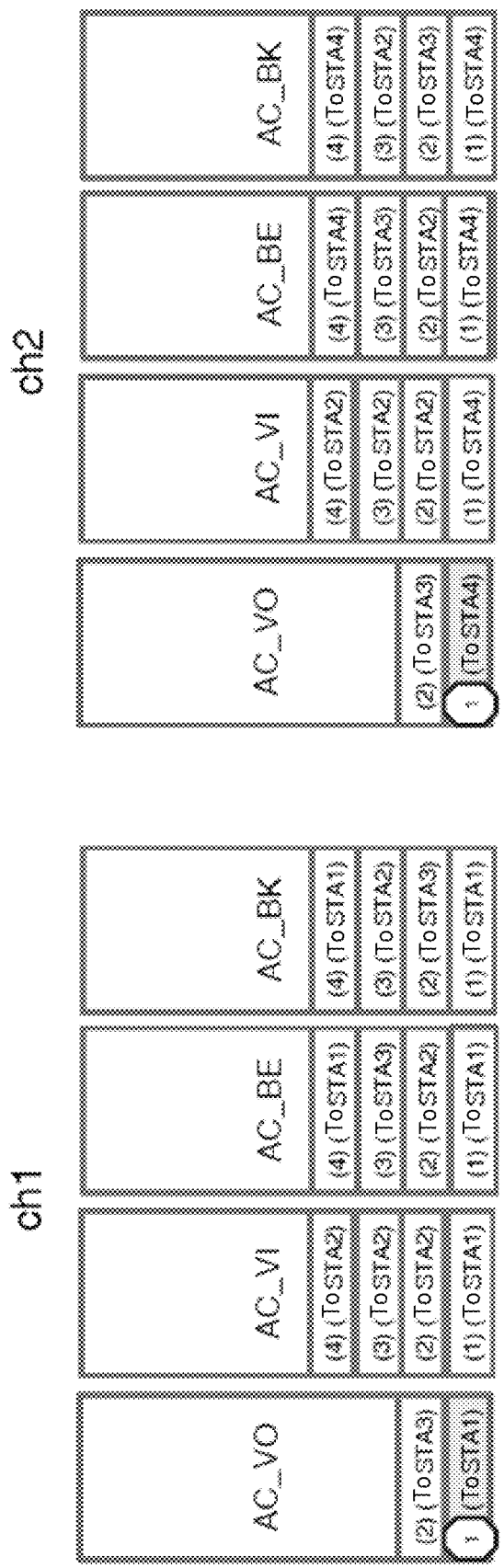
FIG. 11 is a diagram of still another example of a method for data transmission according to an embodiment of the present disclosure.

FIG. 11 is a diagram of still another example of a method for data transmission according to an embodiment of the present disclosure. The method for data transmission is applied to an AP, that is, data is transmitted from the AP to a STA. The method for data transmission in this example can also be applied to the STA. As shown in FIG. 11, a STA1 only supports ch1, a STA4 only supports ch2, and a STA2 and a STA3 support ch1 and ch2. Therefore, in S102, AC data to be transmitted to the STA1 is added to a transmission queue of ch1, AC data to be transmitted to the STA4 is added to a transmission queue of ch2, and AC data to be transmitted to the STA2 and the STA3 is added to transmission queues of ch1 and ch2. In addition, in FIG. 11, AC_VO data in ch1 to be transmitted to the STA1 and AC_VO data in ch2 to be transmitted to the STA4 win transmission right contention of the links at the same time, that is, obtain a link at the same time through contention. Because AC data to be transmitted over different links is of a same category but is different AC data, the different AC data needs to be transmitted over different links in a specific order, and the AC data is deleted from transmission queues of other links. As shown in FIG. 11, because the AC_VO data in ch1 to be transmitted to the STA1 does not exist in a transmission queue of ch2, no delete operation needs to be conducted after the AC_VO data is transmitted. Because the AC_VO data in ch2 to be transmitted to the STA4 does not exist in a transmission queue of ch1, no delete operation needs to be conducted after the AC_VO data is transmitted. It is appreciated that, when transmitted AC data is still possibly in another link, a deletion operation should be conducted.

Figure 12:
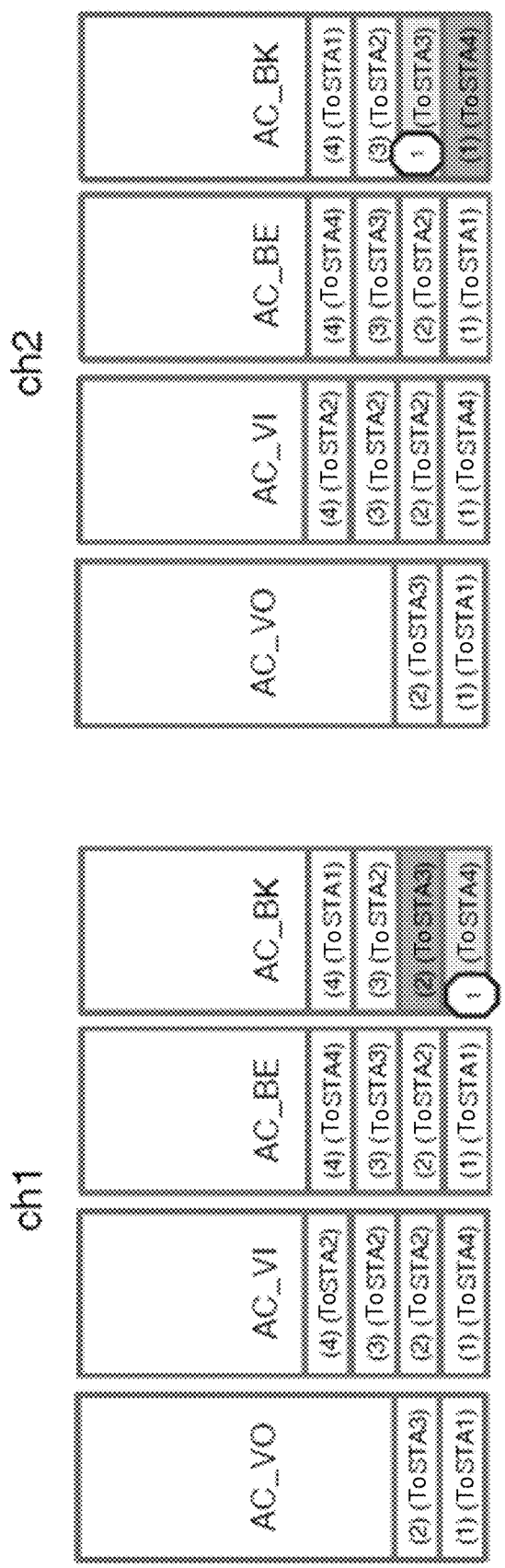
FIG. 12 is a diagram of still another example of a method for data transmission according to an embodiment of the present disclosure.

FIG. 12 is a diagram of still another example of a method for data transmission according to an embodiment of the present disclosure. The method for data transmission is applied to an AP, that is, data is transmitted from the AP to a STA. The method for data transmission in this example can also be applied to the STA. As shown in FIG. 12, a STA1, a STA2, a STA3, and a STA4 all support ch1 and ch2. Therefore, in S102, AC data to be transmitted to the STA1, the STA2, the STA3, and the STA4 is added to transmission queues of ch1 and ch2. In addition, in FIG. 12, AC_BK data in ch1 and AC_BK data in ch2 win transmission right contention of the links at the same time, that is, obtain a link at the same time through contention. After arbitration is conducted, the AC_BK data is transmitted to the STA4 over ch1, and the AC_BK data that is still in ch2 is deleted at the same time. In addition, the AC_BK data is transmitted to the STA3 over ch2, and the AC_BK data that is still in ch1 is deleted at the same time.

In a possible implementation, when different AC data of a same category in different links obtains links at the same time through contention, the AC data may be sequentially transmitted over the two or more links according to at least one of the following manners, and the AC data that is still in transmission queues of other links of the multiple links may be deleted.

In a first manner, different AC data of a same category may be transmitted based on priorities of the links. For example, the priorities of the links may be preset for the links. For example, the different AC data of the same category may be sequentially transmitted in descending order of the priorities, and the different AC data of the same category may be sequentially deleted from transmission queues of other links in which the AC data exists.

In a second manner, different AC data of a same category may be transmitted based on timeslot shifts corresponding to the links. The timeslot shifts may be preset for the links. For example, the different AC data of the same category may be transmitted based on start points corresponding to the timeslot shifts. In FIG. 10, in ch1, ch2, ch3, and ch4, a time order of the start points corresponding to the timeslot shifts is sequentially ch1, ch2, ch3, and ch4. Because the start points corresponding to the timeslot shifts are different, in each timeslot, only one link can obtain an opportunity for transmitting AC data. In this way, in the four links, when the different AC data of the same category obtains a link at the same time through contention, for example, the different AC data of the same category may be sequentially transmitted in the order: ch1, ch2, ch3, and ch4, and the different AC data of the same category is sequentially deleted from transmission queues of other links in which the AC data exists.

In a third manner, different AC data of a same category may be sequentially transmitted based on an arbitration result that is obtained in an arbitration time of the link, and the different AC data of the same category is sequentially deleted from transmission queues of the other links in which the AC data exist. The arbitration time may be preset for the links. For example, a configuration example of the arbitration time is shown in FIG. 10.

In a fourth manner, different AC data of a same category may be transmitted based on a link load status of each link that acquires a transmission right. For example, the different AC data of the same category may be sequentially transmitted in ascending order of link load in the links that obtain transmission rights, and the different AC data of the same category is sequentially deleted from transmission queues of other links.

In the foregoing examples, the examples in which AC data is transmitted from the AP to the STA are mainly described. However, the present disclosure is not limited thereto, and the method for data transmission in these examples can also be applied to a case in which data is transmitted from the STA to the AP, that is, the method for data transmission can be applied to the STA. Several examples in which data is transmitted from a STA to an AP are provided in the following.

Figure 13:
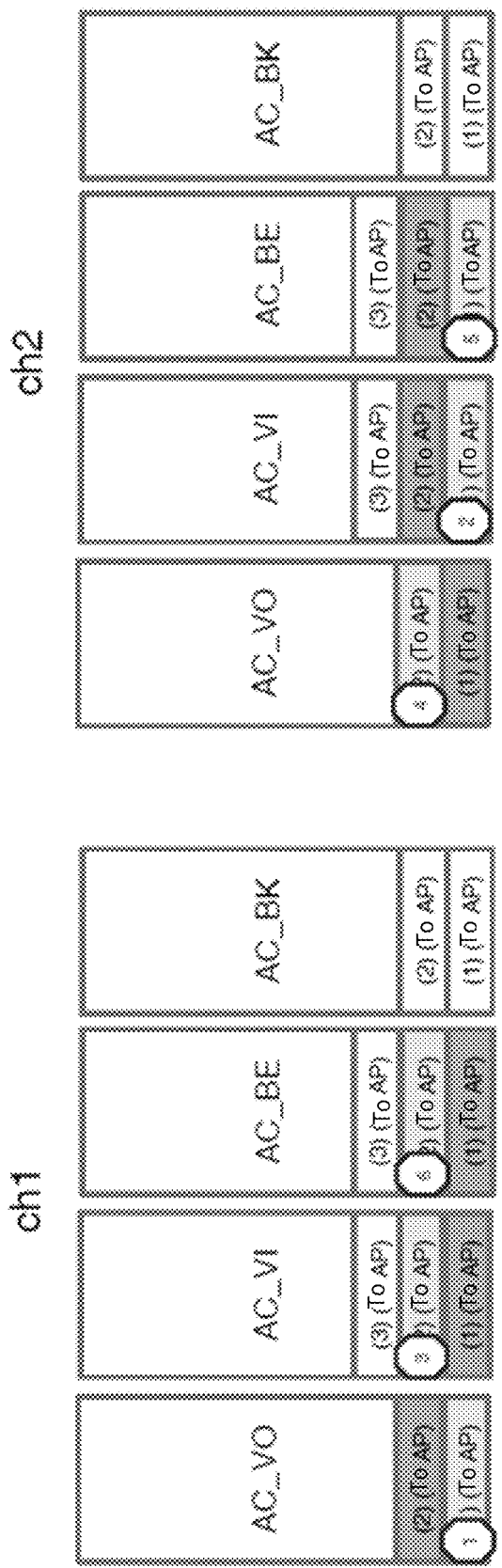
FIG. 13 is a diagram of still another example of a method for data transmission according to an embodiment of the present disclosure.

FIG. 13 is a diagram of still another example of a method for data transmission according to an embodiment of the present disclosure. In this example, the method for data transmission is applied to a STA, that is, data is transmitted from the STA to an AP. The method for data transmission in this example can also be applied to the AP. The method for data transmission applied to the STA is basically the same as that applied to the AP. However, since there is usually one AP and multiple STAs, a process for transmitting AC data from the STA to the AP is simpler than that for transmitting the AC data from the AP to the STA. As shown in FIG. 13, the STA supports ch1 and ch2. Therefore, in S102, all AC data to be transmitted to the AP is added to transmission queues of ch1 and ch2. In addition, as shown in FIG. 13, vol data, VI2 data, VI1 data, VO2 data, BE2 data, and BE1 data sequentially obtain links through transmission right contention of the links. Correspondingly, in S103, an order in which the STA transmits the AC data to the AP is as follows: (1) the STA transmits, over ch1, the VO data to be transmitted to the AP, and deletes the data from a transmission queue of ch2; (2) the STA transmits, over ch2, the VI data to be transmitted to the AP, and deletes the data from a transmission queue of ch1; (3) the STA transmits, over ch1, the VI data to be transmitted to the AP, and deletes the data from a transmission queue of ch2; (4) the STA transmits, over ch2, the VO data to be transmitted to the AP, and deletes the data from a transmission queue of ch1; (5) the STA transmits, over ch2, the BE data to be transmitted to the AP, and deletes the data from a transmission queue of ch1; (6) the STA transmits, over ch1, the BE data to be transmitted to the AP, and deletes the data from a transmission queue of ch2. Since the AC data transmitted in (1) to (6) exists in a transmission queue of another link, the AC data is sequentially deleted from transmission queues of other links.

Figure 14:
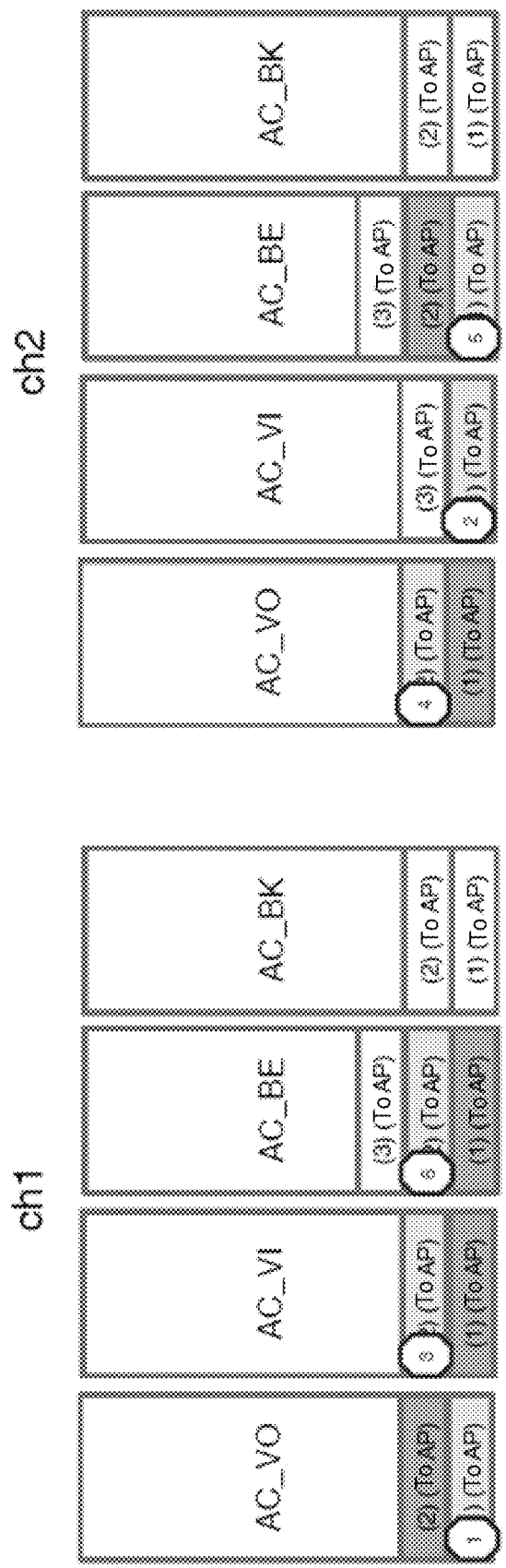
FIG. 14 is a diagram of still another example of a method for data transmission according to an embodiment of the present disclosure.

FIG. 14 is a diagram of still another example of a method for data transmission according to an embodiment of the present disclosure. In this example, the method for data transmission is applied to a STA, that is, AC data is transmitted from the STA to an AP. The method for data transmission in this example can also be applied to the AP. As shown in FIG. 14, AC_VO data, AC_BE data, and AC_BK data to be transmitted to the AP support ch1 and ch2, AC_VI(1) data to be transmitted to the AP supports ch1 and ch2, AC_VI(2) data to be transmitted to the AP only supports ch1, and AC_VI(3) data to be transmitted to the AP only supports ch2. Therefore, in S102, the AC_VO data, the AC_BE data, the AC_BK data, and the AC_VI(1) data that are to be transmitted to the AP are added to ch1 and ch2, the AC_VI(2) data to be transmitted to the AP is only added to ch1, and the AC_VI(3)) data is only added to ch2. Therefore, as shown in FIG. 14, based on a result of transmission right contention of the links, an order in which the STA transmits the AC data to the AP is as follows: (1) the STA transmits, over ch1, AC_VO(1) data to be transmitted to the AP, and deletes the data from a transmission queue of ch2; (2) the STA transmits, over ch2, AC_VI(1) data to be transmitted to the AP, and deletes the data from a transmission queue of ch1; (3) the STA transmits, over ch1, AC_VI(2) data to be transmitted to the AP; (4) the STA transmits, over ch2, AC_VO(2) to be transmitted to the AP, and deletes the data from a transmission queue of ch1; (5) the STA transmits, over ch2, AC_BE(1) data to be transmitted to the AP, and deletes the data from a transmission queue of ch1; (6) the STA transmits, over ch1, AC_BE(2) data to be transmitted to the AP, and deletes the data from a transmission queue of ch2. Since the AC data transmitted in (1), (2), (4), (5), and (6) exists in a transmission queue of another link, the AC data is deleted from transmission queues of other links in which the AC data exists. Because the AC data transmitted in (3) does not exist in a transmission queue of another link, no delete operation needs to be conducted.

In addition, in a possible implementation, in S103, a link over which AC data is to be transmitted may be automatically select from available links of the AC data based on the result of transmission right contention of the multiple links and a load status or a congestion status of the available links.

In an embodiment, for example, under a condition that it is obtained, based on the result of transmission right contention of the multiple links, that AC data in ch1 obtains the link through contention and ch1 is in a good load state (that is, there is normal or relatively low load), the AC data may be transmitted over ch1. However, under a condition that ch1 is in a poor load state (that is, there is relatively high load), when the AC data exists in other links (for example, ch2), ch2 may be selected to transmit the AC data. In addition, under a condition that ch1 is operating normally (that is, ch1 is not congested), the AC data is usually transmitted over ch1. Under a condition that ch1 is operating abnormally (ch1 is congested), when the AC data exists in other links (for example, ch2), ch2 may be selected to transmit the AC data.

In addition, in a possible implementation, for simplicity and compatibility, when the AC data fails to be transmitted over a determined link, the AC data may be usually transmitted again over the determined link, that is, retry (hardware retry) is usually only applied to a previous link. For example, AC_VO data to be transmitted to a STA1 supports links 1, 2, 3, and 4. Under a condition that the link 2 acquires a transmission right, the AC_VO data is transmitted over the link 2, and the AC_VO data is deleted from other links. In this case, under a condition that the AC_VO data fails to be transmitted over the link 2, the AC_VO data is usually transmitted again (retry) only over the link 2. It is appreciated that, under a condition that the AC_VO data still fails to be transmitted over the link 2 after retry is conducted for a predetermined times of retries, a link may be reselected for transmitting the AC_VO data.

In addition, for simplicity and compatibility considerations, as specified in existing protocols, an encryption key of each link is independently maintained. In an embodiment, under a condition that basic service set identifiers (BSSID) of different links are different, encryption keys of different links are different. In addition, under a condition that BSSIDs of all links are the same, encryption keys of all the links are the same, but production numbers (PN) in encryption keys of different links are different. Encryption and decryption manners of each link are the same as those specified in the existing protocol, and details are not described herein. Therefore, according to the method for data transmission in this embodiment of the present disclosure, data to be transmitted may be added to a transmission queue of an available link corresponding to the data, without pre-allocating a link for the data. Then, the data is transmitted based on a result of transmission right contention of links, and after the data is transmitted over a link, the data that is still in a transmission queue of another link is deleted. In this way, according to the method for data transmission in the present disclosure, the data can be transmitted by using all allowed links (available links). This helps to reduce a delay. In addition, each link can be better used dynamically, thereby improving the data transmission efficiency.

The method for data transmission in the present disclosure is not limited to the foregoing embodiments. In other embodiments, the method for data transmission may be applied to an AP, a STA, or other types of first devices. There may be multiple links between the first device and a second device. The method for data transmission mainly includes the following steps:

Determining an available link from the multiple links for data to be transmitted to the second device; and Transmitting the data based on a result of transmission right contention of the multiple links.

In an embodiment, the data includes AC data, and the AC data includes at least one of AC_VO data, AC_VI data, AC_BE data, and AC_BK data.

In a possible implementation, the transmitting the data based on a result of transmission right contention of the multiple links may include:

When transmission rights are acquired by AC data of different categories in two or more links of the multiple links at the same time, transmitting the AC data over the two or more links.

In a possible implementation, the transmitting the data based on a result of transmission right contention of the multiple links may include:

When transmission rights are acquired by same AC data of a same category in two or more links of the multiple links at the same time, transmitting the AC data over one link of the two or more links. In an embodiment, when the transmission rights are acquired by the same AC data of the same category in the two or more links of the multiple links at the same time, arbitration may be conducted to determine one link from the two or more links to transmit the AC data. For a specific arbitration manner, please refer to the four manners, in the method for data transmission in the foregoing embodiments, of determining, when same AC data of a same category in different links obtains a link at the same time through contention, a link for transmitting the AC data. Details are not described herein again.

In a possible implementation, the transmitting the data based on a result of transmission right contention of the multiple links may include:

When transmission rights are acquired by different AC data of a same category in two or more links of the multiple links at the same time, transmitting the AC data over the two or more links.

In the method for data transmission, similarly, an available link is first for determined for data to be transmitted, and then the data is transmitted based on a result of transmission right contention of links, without pre-allocating a link for the data. Same as the case in the foregoing method embodiments, after the available link is determined, the data may be added to a transmission queue of the available link, and after the data is transmitted over a link, the data that is still in a transmission queue of another link is deleted. Alternatively, other manners may be used to record or manage specific data to be transmitted over each link, without adding data to or deleting data from a transmission queue of the link. In this way, according to the method for data transmission in the present disclosure, the data can be transmitted by using all allowed links (available links). This helps to reduce a delay. In addition, each link can be better used dynamically, thereby improving the data transmission efficiency.

Figure 15:
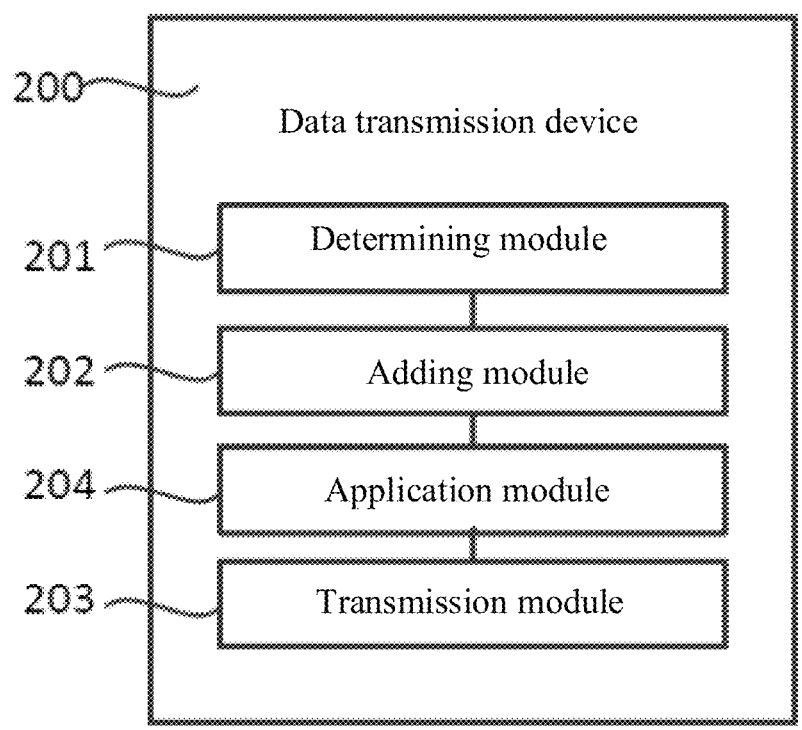
FIG. 15 is a structural block diagram of a device for data transmission according to another embodiment of the present disclosure.

FIG. 15 is a structural block diagram of a device for data transmission according to another embodiment of the present disclosure. There are multiple links between a device 200 for data transmission and a second device. As shown in FIG. 15, the device 200 for data transmission includes: a determining module 201, configured to determine an available link from the multiple links for the data to be transmitted to the second device; an adding module 202, configured to add the data to a transmission queue of the available link corresponding to the data; and a transmission module 203, configured to transmit the data based on a result of transmission right contention of the multiple links, when the data that is transmitted over one link of the multiple links is still in a transmission queue of another link, the data is deleted from the transmission queue of the another link.

The device 200 for data transmission in this embodiment may be configured to implement the method for data transmission described in the foregoing embodiments. For a specific process of the foregoing method for data transmission, please refer to the detailed description of the foregoing embodiments.

In a possible implementation, the transmission module 203 may be configured to: when one link of the multiple links acquires a transmission right, transmit the data over the link, and delete the data that is still in a transmission queue of another link of the multiple links.

In a possible implementation, the device 200 for data transmission may further include: an application module 204, configured to apply a timeslot shift technique to the multiple links.

In a possible implementation, the data includes AC data, and the AC data includes at least one of AC_VO data, AC_VI data, AC_BE data, and AC_BK data.

In a possible implementation, the transmission module 203 may be configured to: when transmission rights are acquired by AC data of different categories in two or more links of the multiple links at the same time, transmit the AC data over the two or more links, and delete the AC data that is still in transmission queues of other links of the multiple links.

In a possible implementation, the transmission module 203 may be configured to: when transmission rights are acquired by same AC data of a same category in two or more links of the multiple links at the same time, transmit the AC data over one link of the two or more links, and delete the AC data that is still in transmission queues of other links of the multiple links.

In a possible implementation, the transmission module 203 may be configured to: when the transmission rights are acquired by the same AC data of the same category in the two or more links of the multiple links at the same time, conduct arbitration to determine one link from the two or more links to transmit the AC data, and delete the AC data that is still in transmission queues of other links of the multiple links.

In a possible implementation, the transmission module 203 may be configured to: when transmission rights are acquired by different AC data of a same category in two or more links of the multiple links at the same time, transmit the AC data over the two or more links, and delete the AC data that is still in transmission queues of other links of the multiple links.

In a possible implementation, when the data fails to be transmitted over a determined link, the transmission module 203 transmits the data over the determined link again.

In a possible implementation, the device 200 for data transmission is an AP, and the second device is a STA; or the device 200 for data transmission is a STA, and the second device is an AP.

Therefore, the device for data transmission in this embodiment of the present disclosure may add data to be transmitted to a transmission queue of an available link corresponding to the data, without pre-allocating a link for the data. Then, the device for data transmission transmits the data based on a result of transmission right contention of links, and after transmitting the data in a link, deletes the data that is still in a transmission queue of another link. In this way, according to the device for data transmission in the present disclosure, the data can be transmitted by using all allowed links (available links). This helps to reduce a delay. In addition, each link can be better used dynamically, thereby improving the data transmission efficiency.

The device for data transmission of the present disclosure is not limited to the foregoing embodiments. In another embodiment, the device for data transmission may be applied to an AP, a STA, or other types of first devices. There may be multiple links between the first device and the second device, and the device for data transmission includes a determining module, configured to determine an available link from the multiple links for data to be transmitted to the second device; a transmission module, configured to transmit the data based on a result of transmission right contention of the multiple links.

In a possible implementation, the data includes AC data, and the AC data includes at least one of AC_VO data, AC_VI data, AC_BE data, and AC_BK data.

In a possible implementation, the transmission module may be configured to: when transmission rights are acquired by AC data of different categories in two or more links of the multiple links at the same time, transmit the AC data over the two or more links.

In a possible implementation, the transmission module may be configured to: when transmission rights are acquired by same AC data of a same category in two or more links of the multiple links at the same time, transmit the AC data over one link of the two or more links. In an embodiment, when the transmission rights are acquired by the same AC data of the same category in the two or more links of the multiple links at the same time, arbitration may be conducted to determine one link from the two or more links to transmit the AC data. For a specific arbitration manner, please refer to the four manners, in the method for data transmission in the foregoing embodiments, determining, when same AC data of a same category in different links obtains a link at the same time through contention, a link for transmitting the AC data. Details are not described herein again.

In a possible implementation, the transmission module may be configured to: when transmission rights are acquired by different AC data of a same category in two or more links of the multiple links at the same time, transmit the AC data over the two or more links.

The device for data transmission can also first determine an available link for data to be transmitted and then transmit the data based on a result of transmission right contention of links, without pre-allocating a link for the data. Same as the case in the foregoing device embodiments, after determining the available link, the device for data transmission may add the data to a transmission queue of the available link, and after transmitting the data in a link, delete the data that is still in a transmission queue of another link. Alternatively, the device for data transmission may use other manners to record or manage specific data to be transmitted over each link, without adding data to or deleting data from a transmission queue of the link. In this way, according to the device for data transmission in the present disclosure, the data can be transmitted by using all allowed links (available links). This helps to reduce a delay. In addition, each link can be better used dynamically, thereby improving the data transmission efficiency.

Figure 16:
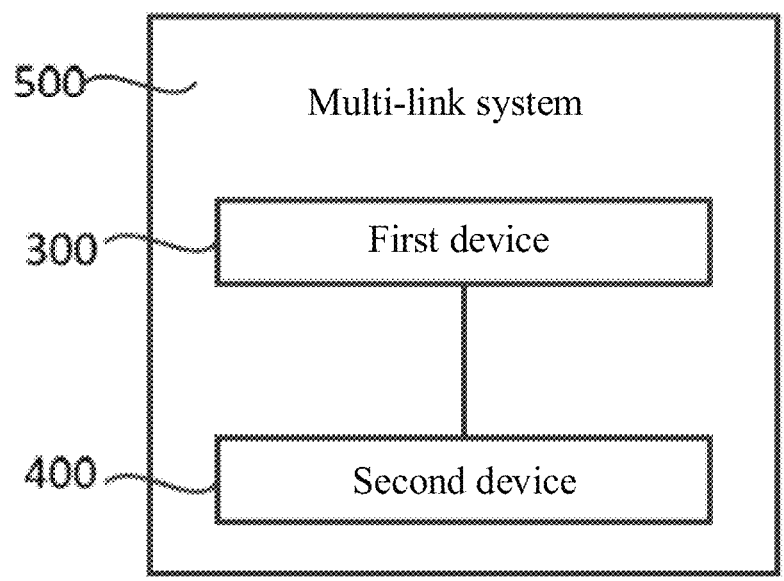
FIG. 16 is a structural block diagram of a multi-link system according to another embodiment of the present disclosure.

FIG. 16 is a structural block diagram of a multi-link system according to another embodiment of the present disclosure. As shown in FIG. 16, the multi-link system 500 includes a first device 300 and a second device 400. There are multiple links between the first device 300 and the second device 400, and the first device 300 may be the foregoing device 200 for data transmission.

Both the first device and the second device in the multi-link system in this embodiment may be configured to implement the method for data transmission described in the foregoing embodiments. For a specific process of the foregoing method for data transmission, refer to the detailed description of the foregoing embodiments.

Therefore, the multi-link system in this embodiment of the present disclosure may add data to be transmitted to a transmission queue of an available link corresponding to the data, without pre-allocating a link for the data. Then, the multi-link system transmits the data based on a result of transmission right contention of links, and after transmitting the data in a link, deletes the data that is still in a transmission queue of another link. In this way, according to the device for data transmission in the present disclosure, the data can be transmitted by using all allowed links (available links). This helps to reduce a delay. In addition, each link can be better used dynamically, thereby improving the data transmission efficiency.

Figure 17:
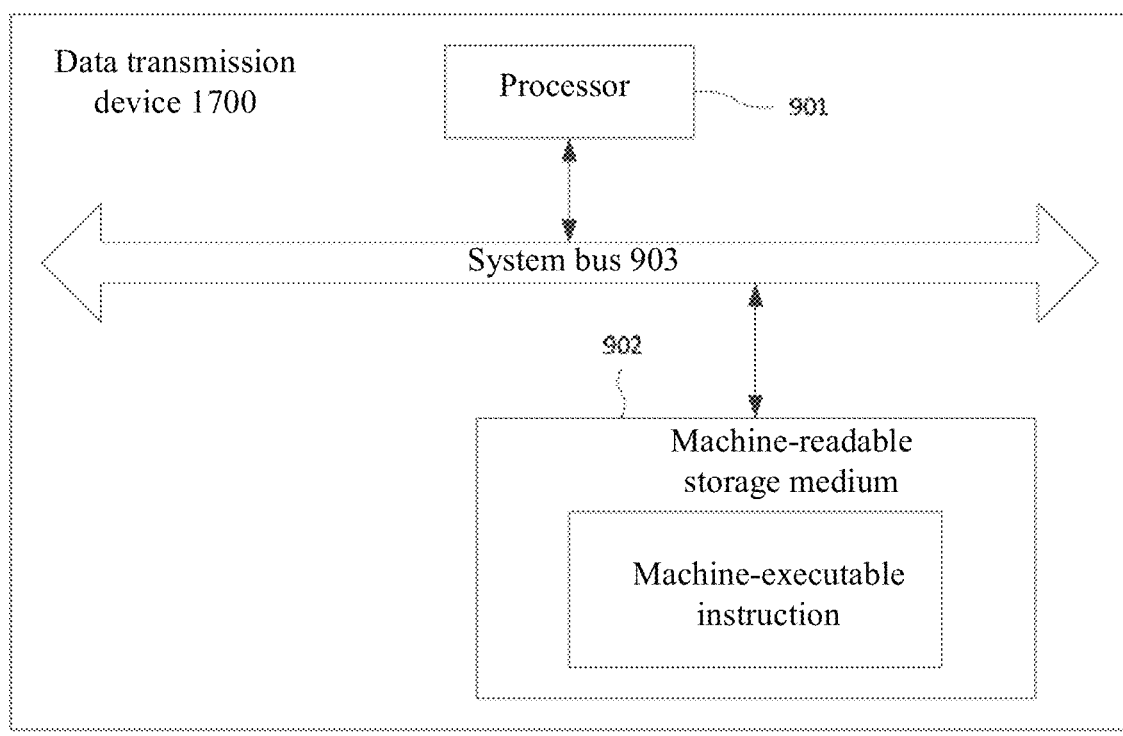
FIG. 17 is a structural block diagram of hardware of a device for data transmission according to still another embodiment of the present disclosure.

FIG. 17 is a structural block diagram of hardware of a device for data transmission according to another embodiment of the present disclosure. Referring to FIG. 17, the device 1700 may include a processor 901 and a machine-readable storage medium 902 that stores machine-executable instructions. The processor 901 and the machine-readable storage medium 902 may communicate with each other through a system bus 903. In addition, the processor 901 reads the machine-executable instructions that are in the machine-readable storage medium 902 and that are corresponding to the foregoing method for data transmission, to implement the method for data transmission.

The machine-readable storage medium 902 mentioned in this specification may be any electronic, magnetic, optical or other physical storage device, and may include or store information such as executable instructions and data. For example, the machine-readable storage medium may be random access memory (RAM), a volatile memory, a non-volatile memory, a flash memory, a storage drive (such as a hard drive), a solid state drive, any type of storage disc (such as an optical disc and a digital video disc (DVD)), or a similar storage medium, or a combination thereof.

Figure 18:
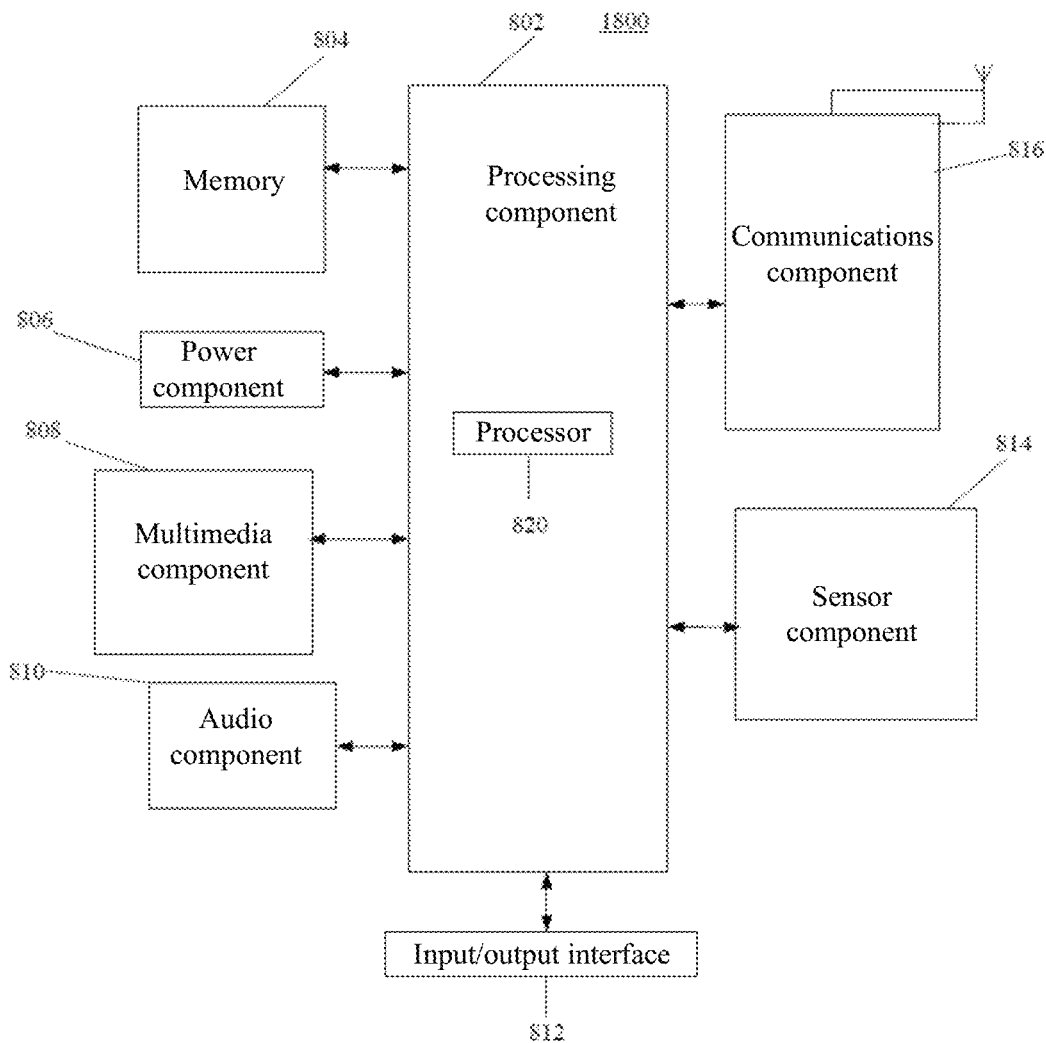
FIG. 18 is a structural block diagram of hardware of a device for data transmission according to still another embodiment of the present disclosure.

FIG. 18 is a structural block diagram of hardware of a device for data transmission according to another embodiment of the present disclosure. For example, the device 1800 may be a mobile phone, a computer, a digital broadcast terminal, a message transceiving device, a gaming console, a tablet device, a medical device, a fitness device, and a personal digital assistant.

Referring to FIG. 18, the device 1800 may include one or more of the following components: a processing component 802, a memory 804, a power component 806, a multimedia component 808, an audio component 810, an input/output (I/O) interface 812, a sensor component 814, and a communications component 816.

The processing component 802 usually controls the overall operation of the device 1800, for example, operations associated with display, phone calls, data communication, camera operations, and recording operations. The processing component 802 may include one or more processors 820 for executing instructions, to complete all or some of the steps of the method described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the device 1800. Examples of such data include instructions for any application or method operating on the device 1800, contact data, phone book data, messages, pictures, videos, and the like. The memory 804 may be implemented by any type of volatile or nonvolatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power component 806 provides power to the various components of the device 1800. The power component 806 may include a power management system, one or more power supplies, and other components associated with power generation, management, and distribution for the device 1800.

The multimedia component 808 includes a screen providing an output interface between the device 1800 and a user. In some embodiments, the screen may include a liquid crystal display (LCD) and a touch panel (TP). Under a condition that the screen includes a touch panel, the screen may be implemented as a touchscreen to receive input signals from the user. The touch panel includes one or more touch sensors to sense touch, swipe, and gestures on the touch panel. The touch sensor may not only sense a boundary of the touch or swipe action, but also detect duration and pressure related to the touch or swipe operation. In some embodiments, the multimedia component 808 includes a front-facing camera and/or a rear-facing camera. The front-facing camera and/or the rear-facing camera can receive external multimedia data when the device 1800 is in an operating mode, such as a shooting mode or a video mode. Each front-facing camera and rear-facing camera may be a fixed optical lens system or have a focal length and optical zoom capability.

The audio component 810 is configured to output and/or input an audio signal. For example, the audio component 810 includes a microphone (MIC). When the device 1800 is in an operating mode, such as a call mode, a recording mode, or a voice recognition mode, the microphone is configured to receive an external audio signal. The received audio signal may be further stored in the memory 804 or transmitted through the communications component 816. In some embodiments, the audio component 810 further includes a loudspeaker configured to output an audio signal.

The I/O interface 812 provides an interface between the processing component 802 and a peripheral interface module, and the peripheral interface module may be a keyboard, a click wheel, a button, and the like. The buttons may include but are not limited to a home button, a volume button, a start button, and a lock button.

The sensor component 814 includes one or more sensors configured to provide status assessment of various aspects for the device 1800. For example, the sensor component 814 may detect an on/off state of the device 1800, and relative positioning of components. For example, the components are a display and a keypad of the device 1800. The sensor component 814 may also detect a position change of the device 1800 or a component of the device 1800, the presence or absence of user contact with the device 1800, orientation or acceleration/deceleration of the device 1800, and a temperature change of the device 1800. The sensor component 814 may include a proximity sensor configured to: when there is no physical contact, detect whether a nearby object exists. The sensor component 814 may alternatively include an optical sensor, such as a CMOS or CCD image sensor, for use in imaging applications. In some embodiments, the sensor component 814 may alternatively include an accelerometer sensor, a gyroscope sensor, a magnetic sensor, a pressure sensor, or a temperature sensor.

The communications component 816 is configured to facilitate wired or wireless communication between the device 1800 and other devices. The device 1800 may access a communication standard-based wireless network, such as a Wi-Fi network, a 2G or 3G network, or a combination thereof. In an exemplary embodiment, the communications component 816 receives a broadcast signal or broadcast-related information from an external broadcast management system through a broadcast channel. In an exemplary embodiment, the communications component 816 further includes a near-field communication (NFC) module to facilitate short-range communication. For example, the NFC module may be implemented based on a radio frequency identification (RFID) technology, infrared data association (IrDA) technology, ultra-wideband (UWB) technology, Bluetooth (BT) technology, and other technologies.

In an exemplary embodiment, the device 1800 may be implemented by one or more application-specific integrated circuits (ASIC), a digital signal processor (DSP), a digital signal processing device (DSPD), a programmable logic device (PLD), a field-programmable gate array (FPGA), a controller, a microcontroller, a microprocessor, or other electronic components, to implement the foregoing method.

An exemplary embodiment further provides a nonvolatile computer-readable storage medium, such as the memory 804 including computer program instructions. The computer program instructions can be executed by the processor 820 in the device 1800, to complete the foregoing method for data transmission.

The embodiments of the present disclosure have been described above, and the above description is exemplary, not exhaustive, and is not limited to the disclosed embodiments.

It is apparent to persons skilled in the art that many modifications and changes can be made without departing from the scope and spirit of the described embodiments. The terms used in the present disclosure are selected to best explain principles of the embodiments, actual applications, or improvements to technologies in the market, or to make other persons of ordinary skill in the art to understand the embodiments disclosed in the present disclosure.

What is claimed is:

1. A device for data transmission, comprising:
    at least one processor; and
    a memory, configured to store processor-executable instructions,
    wherein when executing the processor-executable instructions, the at least one processor is configured to:
    determine, from a plurality of links, available links that support certain data and certain category types of data to be transmitted to second devices, wherein each of the second devices supports one or more available links;
    add the data to a transmission queue of each of the available links corresponding to the data;
    determine a result of transmission right contention of the available links based on a transmission priority order of certain category types of data supported by the available links for transmitting the data;
    transmit the data based on the result of transmission right contention of the available links; and
    in response to the data that has been transmitted over one or more of the available links being still in the transmission queues of other available links, delete the data from the transmission queues of the other available links,
    wherein the at least one processor is further configured to:
        in response to transmission rights being acquired by data of different categories to be sent to different second devices in two or more of the available links at the same time, transmit the data over the two or more available links to the different second devices, and delete the data from transmission queues of other available links; and/or
        in response to transmission rights being acquired by different data of a same category to be sent to different second devices in two or more of the available links at the same time, transmit the data over the two or more available links to the different second devices, and delete the data from transmission queues of other available links.

2. The device for data transmission according to claim 1, wherein the at least one processor is further configured to:
    apply a timeslot shift technique to the plurality of links, and
    determine, based on timeslot shifts corresponding to the plurality of links, a link that acquires a transmission right for transmitting the data.

3. The device for data transmission according to claim 1, wherein the at least one processor is further configured to:
    in response to one of the available links acquiring a transmission right, transmit the data over the available link, and delete the data from transmission queues of other-available links, or
    in response to transmission rights being acquired by AC data of different categories in two or more of the available links at the same time, transmit the AC data over the two or more available links; and/or
    in response to transmission rights being acquired by same AC data of a same category in two or more of the available links at the same time, transmit the AC data over one of the two or more available links; and/or
    in response to transmission rights being acquired by different AC data of a same category in two or more of the available links at the same time, transmit the AC data over the two or more available links.

4. The device for data transmission according to claim 3, wherein the at least one processor is further configured to:
    in response to transmission rights being acquired by same AC data of a same category in two or more of the available links at the same time,
    conduct arbitration to determine one available link from the two or more available links to transmit the AC data.

5. The device for data transmission according to claim 1, wherein the at least one processor is further configured to:
    in response to transmission rights being acquired by same AC data of a same category in two or more of the available links at the same time, transmit the AC data over one of the two or more available links, and delete the AC data from transmission queues of other available links, and
    in response to transmission rights being acquired by the same AC data of the same category in the two or more of the available links at the same time, conduct arbitration to determine one available link from the two or more available links for transmitting the AC data, and delete the AC data from transmission queues of other available links.

6. The device for data transmission according to claim 4, wherein the at least one processor is further configured to:
    determine, based on priorities of the available links, an available link for transmitting the AC data; and/or
    determine, based on an arbitration result obtained within a predetermined arbitration time, an available link for transmitting the AC data; and/or
    determine, based on a link load status of each available link that acquires a transmission right, an available link for transmitting the AC data.

7. The device for data transmission according to claim 4, wherein the at least one processor is further configured to:
    in response to the data failing to be transmitted over a determined available link, the at least one processor is further configured to transmit the data over the determined available link again, and/or
    the device is an access point (AP), and the second device is a station (STA); or the device is a STA, and the second device is an AP.

8. A non-transitory computer-readable storage medium, wherein the computer-readable storage medium stores computer program instructions thereon, the computer program instructions, when being executed by a processor, cause the processor to:
    determine, from a plurality of links, available links that support certain data and certain category types of data to be transmitted to second devices, wherein each of the second devices supports one or more available links;
    add the data to a transmission queue of each of the available links corresponding to the data;
    determine a result of transmission right contention of the available links based on a transmission priority order of certain category types of data supported by the available links for transmitting the data;
    transmit the data based on the result of transmission right contention of the available links; and
    in response to the data that has been transmitted over one or more of the available links being still in the transmission queues of other available links, delete the data from the transmission queues of the other available links, wherein the computer program instructions further cause the processor to:

in response to transmission rights being acquired by data of different categories to be sent to different second devices in two or more of the available links at the same time, transmit the data over the two or more available links to the different second devices, and delete the data from transmission queues of other available links; and/or in response to transmission rights being acquired by different data of a same category to be sent to different second devices in two or more of the available links at the same time, transmit the data over the two or more available links to the different second devices, and delete the data from transmission queues of other available links.

9. A method for data transmission, applied to a first device having a plurality of links to second devices, wherein the method comprises:

determining, from the plurality of links, available links that support certain data and certain category types of data to be transmitted to the second devices, wherein each of the second devices supports one or more available links;

adding the data to a transmission queue of each of the available links corresponding to the data;

determining a result of transmission right contention of the available links based on a transmission priority order of certain category types of data supported by the available links for transmitting the data;

transmitting the data based on the result of transmission right contention of the available links; and in response to the data that has been transmitted over one or more of the available links being still in the transmission queues of other available links, deleting the data from the transmission queues of the other available links, wherein transmitting the data based on the result of transmission right contention of the available links comprises:

in response to transmission rights being acquired by data of different categories to be sent to different second devices in two or more of the available links at the same time, transmitting the data over the two or more available links to the different second devices, and deleting the data from transmission queues of other available links; and/or in response to transmission rights being acquired by different data of a same category to be sent to different second devices in two or more of the available links at the same time, transmitting the data over the two or more available links to the different second devices, and deleting the data from transmission queues of other available links.

10. The method according to claim 9, wherein said transmitting the data based on a result of transmission right contention of the available links comprises:

in response to one available link of the available links acquiring a transmission right, transmitting the data over the one available link, and deleting the data from transmission queues of the other available links.

11. The method according to claim 9, wherein prior to transmitting the data based on a result of transmission right contention of the available links, the method further comprises:

applying a timeslot shift technique to the plurality of links.

12. The method according to claim 11, wherein said applying a timeslot shift technique to the plurality of links comprises:

determining, based on timeslot shifts corresponding to the available links, an available link that acquires a transmission right for transmitting the data.

13. The method according to claim 9, wherein said transmitting the data based on a result of transmission right contention of the available links comprises:

in response to transmission rights being acquired by access category (AC) data of different categories in two or more of the available links at the same time, transmitting the AC data over the two or more available links; and/or in response to transmission rights being acquired by same AC data of a same category in two or more of the available links at the same time, transmitting the AC data over one of the two or more available links; and/or in response to transmission rights being acquired by different AC data of a same category in two or more of the available links at the same time, transmitting the AC data over the two or more available links.

14. The method according to claim 13, wherein based on that the transmitting the data based on a result of transmission right contention of the available links comprises in response to transmission rights being acquired by same AC data of a same category in two or more of the available links at the same time, conducting arbitration to determine one available link from the two or more available links for transmitting the AC data.

15. The method according to claim 14, wherein the conducting arbitration to determine one available link from the two or more available links to transmit the AC data comprises:

determining, based on priorities of the available links, an available link for transmitting the AC data; and/or determining, based on an arbitration result obtained within a predetermined arbitration time, an available link for transmitting the AC data; and/or determining, based on a link load status of each available link that acquires a transmission right, an available link for transmitting the AC data.

16. The method according to claim 9, wherein the data comprises access category (AC) data, and the AC data comprises at least one of access category voice (AC_VO) data, access category video (AC_VI) data, access category best effort (AC_BE) data, and access category background (AC_BK) data.

17. The method according to claim 16, wherein said transmitting the data based on a result of transmission right contention of the available links comprises:

in response to transmission rights being acquired by same AC data of a same category in two or more of the available links at the same time, transmitting the AC data over one of the two or more available links, and deleting the AC data from transmission queues of other available links.

18. The method according to claim 17, wherein based on that said transmitting the data based on a result of transmission right contention of the available links comprises in response to transmission rights being acquired by same AC data of a same category in two or more of the available links at the same time, transmitting the AC data over one of the two or more available links, and deleting the AC data from transmission queues of other available links, in response to transmission rights being acquired by the same AC data of the same category in the two or more of the available links at the same time, conducting arbitration to determine one available link from the two or more available links for transmitting the AC data, and deleting the AC data from transmission queues of other available links.

19. The method according to claim 9, wherein based on that the data fails to be transmitted over a determined available link, transmitting the data over the determined available link again; and/or the first device is an access point (AP), and the second device is a station (STA); or the first device is a STA, and the second device is an AP.

* * * * *